United States Patent
Naka et al.

[11] Patent Number: 5,986,635
[45] Date of Patent: Nov. 16, 1999

[54] PROCESSOR FOR CONVERTING PIXEL NUMBER OF VIDEO SIGNAL AND DISPLAY APPARATUS USING THE SAME

[75] Inventors: Kazutaka Naka; Atsushi Maruyama; Hiroyuki Urata; Haruki Takata, all of Yokohama, Japan

[73] Assignee: Hitachi, Ltd., Tokyo, Japan

[21] Appl. No.: 08/837,747

[22] Filed: Apr. 22, 1997

[30] Foreign Application Priority Data

| Apr. 23, 1996 | [JP] | Japan | 8-100883 |
| Jul. 24, 1996 | [JP] | Japan | 8-194337 |
| Sep. 2, 1996 | [JP] | Japan | PCT/JP96/02468 |

[51] Int. Cl.$^6$ .................. G09G 5/00
[52] U.S. Cl. .......... 345/127; 345/132; 348/580; 382/300
[58] Field of Search .......... 345/127, 128, 345/129, 130, 131, 132, 204, 213; 348/580; 382/300

[56] References Cited

U.S. PATENT DOCUMENTS

| 5,054,100 | 10/1991 | Tai | 382/47 |
| 5,229,853 | 7/1993 | Myers | 358/140 |
| 5,341,172 | 8/1994 | Nio et al. | |
| 5,418,899 | 5/1995 | Aoki et al. | |
| 5,422,678 | 6/1995 | Takeuchi | 348/581 |
| 5,457,457 | 10/1995 | Hayashi | 341/144 |
| 5,459,520 | 10/1995 | Sasaki | |
| 5,532,716 | 7/1996 | Sano | 345/132 |
| 5,541,666 | 7/1996 | Zeidler et al. | 348/589 |
| 5,585,864 | 12/1996 | Takeuchi | 348/719 |
| 5,721,570 | 2/1998 | Tsunoda et al. | 345/213 |
| 5,801,678 | 9/1998 | Huang et al. | 345/127 |

FOREIGN PATENT DOCUMENTS

| 534220 | 9/1992 | European Pat. Off. |
| 2224410 | 10/1988 | United Kingdom |

*Primary Examiner*—Dennis-Doon Chow
*Assistant Examiner*—Amr Awad
*Attorney, Agent, or Firm*—Antonelli, Terry, Stout & Kraus, L LP

[57] ABSTRACT

A video signal processor which includes a circuit for converting the number of lines in a digitized video signal, a circuit for generating a display dot clock, a circuit for outputting analog pixel data subjected to a line number conversion and having a frequency different from that of the display dot clock, and a circuit for smoothing the analog pixel data; and in which a frequency fck of the display dot clock, an output frequency frk of the analog pixel data and a frequency fho of the horizontal synchronization signal satisfies an equation;

$$frck/N = fck/M = fho$$

where M and N are natural numbers satisfying M≠N.

30 Claims, 11 Drawing Sheets

TIME

FIG.9
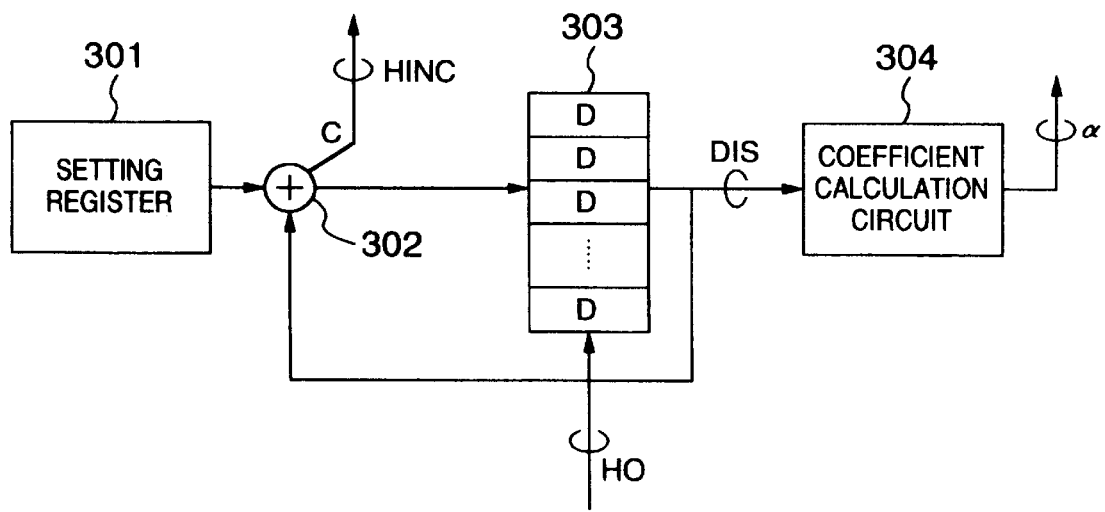
FIG.10A INPUT LINE
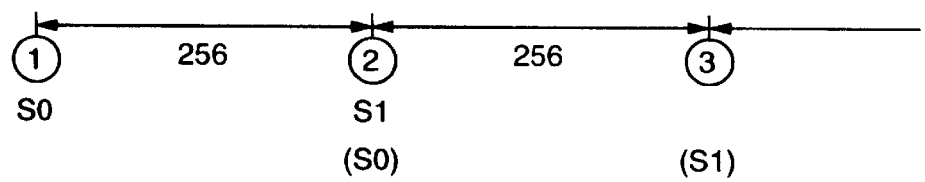
FIG.10B INTERPOLATED LINE
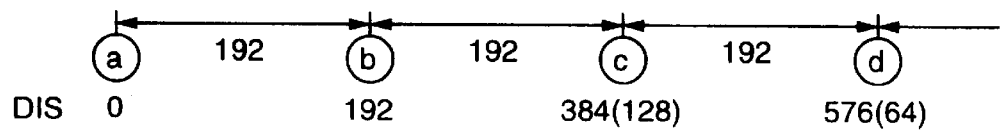

PROCESSOR FOR CONVERTING PIXEL NUMBER OF VIDEO SIGNAL AND DISPLAY APPARATUS USING THE SAME

BACKGROUND OF THE INVENTION

The present invention relates to a processor which receives a display video signal from a computer or the like and performs various sorts of processing operations over the signal according to specifications of a display device to display it on the display device.

A display video signal issued from an engineering workstation, a personal computer or a display terminal of a computer is output as a video signal of dots corresponding to picture elements or pixels on a display screen.

By converting the video signal into a digital signal and using a memory and an arithmetic operating circuit, the digital signal can be subjected to various processing operations including conversion of signal format of field frequency or aspect ratio and such image processing as enlargement/reduction (scaling), screen superposition or geometric transform. For example, when it is desired to form a 4-face multi-screen system in which 4 display devices are arranged adjacent to each other so that 2 of the 4 display devices are vertically in 2 stages and the remainder 2 are horizontally side by side and their 4 display screens are regarded as a single display screen; signals corresponding to ¼ of an input video signal are subjected to a full-screen enlarging operation to display them at corresponding positions on the entire 4 screens. Thus, there can be arranged a display system which is large in scale and high in luminance and resolution.

Output signals issued from these digital signal processing circuits are supposed to be displayed on a display device of a so-called multi-scanning cathode-ray tube (CRT) type, so that horizontal scanning frequency fh, vertical scanning frequency fv, display line number, etc. will vary depending on the format of the input signals and such signal processing contents as enlargement.

In these years, display devices of the conventional cathode-ray tube (CRT) type have been replaced by display devices of liquid crystal, plasma, LED, etc. These display devices have an advantage over the cathode-ray tube type display device that they can be made dimensionally small in depth and thickness with less occupation space and can have a large display screen. These display devices, however, have a problem that a coordinate system for representing respective pixels is fixed and thus cannot be changed. That is, in the display device of the fixed pixel number type, the numbers of horizontal and vertical display pixels (also sometimes referred to as pixel numbers, hereinafter) are fixed so that it is difficult to directly display a signal not conforming to the pixel numbers on the display device without subjecting to any operation. More in detail, it has been difficult to directly display a signal having 480 effective lines or a signal having 1024 horizontal effective pixels and 768 effective lines on a display device having 1280 horizontal pixels and 1024 vertical pixels.

For this reason, when it is desired to correctly display a signal having a pixel number different from that of a display device of the fixed pixel number type, a signal processing circuit for changing such a pixel number is inevitably required. For example, when it is desired to display a signal having 640 horizontal effective pixels on a display device of 1024 pixels, it is necessary to display 8 pixels with use of the 5 pixels of an input signal (640: 1024=5: 8) and thus to generate display pixels through interpolating operation of the input pixels. As methods for interpolating the pixels of a one-dimensional signal, there are known such algorithms as previous-value hold interpolation based on one nearest point, linear interpolation based on near 2 points, and convolution interpolation based on near 4 points. When these algorithms are applied to horizontal and vertical respectively, it is possible to convert the pixel numbers of a two-dimensional image.

Examples of the arrangement of a signal processing circuit for performing such pixel interpolating operation are disclosed in JP-A-5-284334 and JP-A-5-328184.

When these signal processing operations are carried out together with the conversion of signal format of field frequency and aspect ratio and with image processing operations including enlargement/reduction (scaling), screen superimposition, and geometric transform; the numbers of horizontal and vertical pixels can be converted according to the display device for display thereon.

However, these pixel number converting operations are required to be carried out at a higher speed as the display device is increased in its resolution. For example, when it is desired to display 1280 horizontal effective pixels and 1024 effective lines with a frame frequency of 60 Hz, the dot clock becomes 100 MHz or more. For the purpose of realizing such a high speed signal processing operation that the dot clock exceeds 100 MHz, parallel processing operation is employed. The parallel processing operation is such that input pixels are separated into odd-numbered and even-numbered pixels, subjected to a converting operation to provide a double occupation time, and then are subjected to the parallel processing operation by 2 systems of processing circuits. In such a parallel processing system, it is highly difficult to perform arithmetic operation between adjacent pixel data, since pixels are processed as divided into odd-numbered and even-numbered pixel series.

Further, setting of an enlarging (reducing) factor (or scaling factor) requires data to be intermittently read out from a memory, but the data reading unit from the memory is limited by the number of parallel processing series (2 pixel units for the odd-numbered and even-numbered pixel series), which involves such a problem that it is impossible to freely set the enlarging (reducing) factor, thus making it difficult to perform the parallel processing operation.

For this reason, it becomes necessary to perform it with use of such a high-speed device as emitter coupled logic (ECL). However, this involves a problem that this increases power consumption and the heat generation caused by the increased power consumption makes it difficult to make the circuit small in size, with increased costs.

Further, when simplification of the interpolating algorithm and circuit leads to deterioration in the picture quality, it is difficult to provide a display device which can be made small in size with low costs and less power consumption to provide a high quality of picture.

SUMMARY OF THE INVENTION

It is therefore an object of the present invention to provide a video signal processor which eliminates the need for provision of a high-speed signal processing circuit, produces an excellent quality of image, and has a pixel number converting function.

In accordance with the present invention, the above object is attained by performing arithmetic interpolating operation between vertical lines with use of digital signals and by performing interpolating operation between horizontal dots with use of analog signals based on a low pass filter.

Further, in order to realize the horizontal interpolating operation with use of analog signals, a relationship of equation (1) which follows should be satisfied among a conversion frequency frck of a digital/analog (D/A) converter circuit, a frequency fck of a clock CK to the display device, and a frequency fho of a horizontal synchronization signal HO to be issued to the display device.

$$frck/N=fck/M=fho \qquad (1)$$

where, M and N are natural numbers.

Further, in order to fix characteristics of the above low pass filter, the dot clock to the display device is arranged to have a substantially constant frequency regardless of the format of the input video signal.

Furthermore, the above low pass filter are arranged to have such characteristics that a frequency band is limited to ½ or less of the frequency fck of the display dot clock CK.

When the number of horizontal effective pixels of the input video signal coincides with that of the display device, the above low pass filter is bypassed.

In the interline interpolating operation, a weight coefficient when 2 lines of data are to be added together as weighted is generated in accordance with a nonlinear function.

In accordance with the present invention, pixel number conversion can be realized without using a high-speed, large-power-consumption and horizontal pixel interpolating circuit based on digital signals. Further, vertical pixel interpolation can be realized using digital signals without causing any deterioration of image quality.

In accordance with the video signal processor of the present invention, signals having various resolutions can be displayed with less cost and power consumption on such a small-size display device of a fixed pixel number type as liquid crystal, plasma or LED.

When the video signal processor of the present invention is employed, there can be provided a small-sized display device which produces a high quality of image with less power consumption and low costs.

BRIEF DESCRIPTION OF THE DRAWINGS

FIG. 9 is an embodiment of an interpolation control circuit in FIG. 6;

Figs. 10A and 10B are diagrams showing how lines are interpolated;

DESCRIPTION OF THE PREFERRED EMBODIMENTS

Embodiments of the present invention will be explained with reference to the accompanying drawings.

Figure 1:
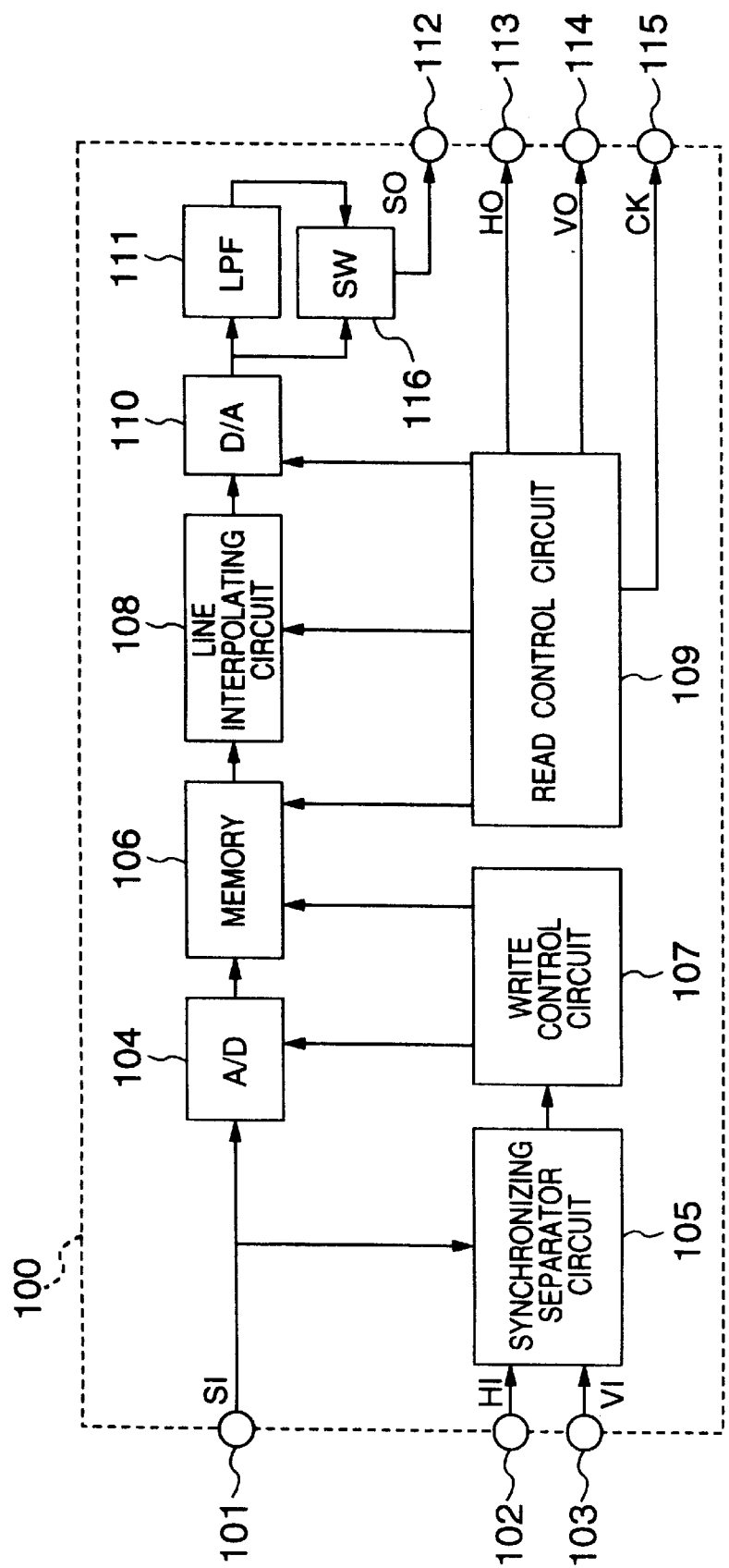
FIG. 1 is a block diagram of a video signal processor in accordance with an embodiment of the present invention.

FIG. 1 is a block diagram of a video signal processor 100 in accordance with an embodiment of the present invention, which includes an input terminal 101 to which a video signal SI is applied from an engineering workstation, personal computer or the like, an input terminal 102 to which a composite synchronization signal HI containing a horizontal synchronization signal of the composite synchronization signal HI or horizontal synchronization information is applied, an input terminal 103 to which a vertical synchronization signal of the video signal SI is applied, an analog/digital (A/D) converter 104 for converting the video signal SI to digital data, a memory 106 for writing therein the video signal converted to the digital data, a synchronizing separator circuit 105 for separating the synchronization signal contained in the input video signal SI or for waveform-shaping the synchronization signals received from the terminals 102 and 103, a write control circuit 107 for generating a write clock and a write control signal to be sent to the memory on the basis of the synchronization information received from the synchronizing separator circuit 105, a line interpolating circuit 108 for converting the number of lines (also sometimes referred to as line number, hereinafter) to coincide with the number of lines of a display device, a digital/analog (D/A) converter 110 for converting the video data read out from the memory to an analog signal, a read control circuit 109 for generating a read control signal to be sent to the memory 106 and a read clock to be sent to the line interpolating 108 and D/A converter circuit 110, a low pass filter (LPF) 111 for removing harmonics components from an output of the D/A converter 110, an output terminal 112 for a video signal S0, an output terminal 113 for a horizontal synchronization signal HO of the output video signal S0, an output terminal 114 for a vertical synchronization signal VO of the output video signal S0, an output terminal 115 for the clock CK of the display device, and a change-over switch 116 for bypassing the LPF.

A video signal received at the terminal 101 is converted by the A/D converter 104 to digital data and then written in the memory 106. At this time, a sampling clock for use in the A/D converter 104 is generated by a phase-locked loop (PLL) part in the write control circuit 107 on the basis of the horizontal synchronization signal received from the synchronizing separator circuit 105.

Under control of the control signal received from the read control circuit 109, data in the memory 106 is read out to the line interpolating circuit 108 and then subjected to an interpolating operation of adjacent lines for line number conversion. The data subjected to the line number change is converted by the D/A converter 110 to an analog signal, subjected by the low pass filter 111 to removal of unnecessary harmonics components, and then output from the terminal 112 as the output video signal S0.

The change-over switch 116 selectively switches between an output of the D/A converter 110 and an output of the low pass filter 111 to output it from the terminal 112. When the number of horizontal effective pixels in the input video signal does not coincide with that of the display device, the change-over switch 116 selects the output signal of the low pass filter 111 to be output from the terminal 112 as the output signal S0. When the number of horizontal effective pixels in the input video signal coincides with that of the display device, on the other hand, the change-over switch 116 selects the output signal of the D/A converter 110 to be output from the terminal 112 as the output signal S0. Thus, the video signal can be output from the output terminal S0 to the display device without being subjected to the band restriction of the low pass filter 111. In this connection, the change-over control of the change-over switch 116 is carried out by a control circuit (not shown) externally provided, in substantially the same manner as the change-over of the pixel number of the input video signal.

The change-over switch 116 may be provided as necessary and in some cases, it can be omitted.

A dot clock signal necessary for the display device is output from the terminal 115.

These terminals 112, 113, 114 and 115 are connected directly to the display device or connected thereto through such an edit controller as a switcher to display the video signal processed by the video signal processor.

Explanation will next be made as to the specific operation, in the case where the signal processor of the present invention is connected to the display device which can display a signal of 1280 horizontal display pixel dots, 1664 total horizontal dots (including blanking dots), 1024 display effective lines, a total number 1078 of lines, a horizontal scanning frequency of 64.3 KHz, a vertical scanning frequency of 60 Hz and a dot clock frequency of 107 MHz; so that a signal of 1024 horizontal effective pixels, 768 effective lines and a vertical scanning frequency of 70 Hz is converted and displayed.

In this example, the effective line number can be increased to 4/3 (768/3×4=1024) and the horizontal effective pixel number can be increased to 5/4 (1024/4×5=1280), so that the input video signal can be fully displayed on the screen of the display device. The video signal processor 100 of the present invention performs converting operations by performing the line number conversion through digital processing operation of the line interpolating circuit 108 and by performing the horizontal pixel interpolation through change of the frequency of the read clock to thereby prolong or shorten a display occupation duration of one pixel.

The A/D converter 104 performs its sampling operation based on the dot clock whose frequency coincides with the effective pixel number of the input video signal, whereby data of 768 lines each having 1024 pixels is written in the memory 106. The image data read out from the memory 106 is sent to the line interpolating circuit 108 where the data is subjected to an interpolating operation to generate 4-line data from 3-line data, whereby the input signal of 768 lines is converted to a display signal of 1024 lines. The interpolating operation causes conversion of the input data to the output data of 1024 lines each having 1024 pixels. In this conjunction, the frequency frck of the read clock is set at 85.6 MHz (=107 MHz×4/5), blanking data of fields each having 54 lines with 308 pixels per line is attached to the data under control of the read control circuit 109, whereby the data is output to the display device as the video signal of a total of 1332 of horizontal dots and a total of 1078 of lines. Through such processing operations, the output video signal of the signal processor 100 can have the horizontal scanning frequency fho of 64.3 KHz (=85.6 MHz/1332) and 1078 of lines, and thus it can be displayed in exactly the same manner as when a signal of originally 1280×1024 pixels is input directly to the display device. In this connection, the dot clock CK to the display device is generated from frequency-multiplying the horizontal synchronization signal HO to the display device by increasing 1664 times (that is, 64.3 KHz×1664=107 MHz), and then supplied to the display device. When the clock CK is supplied to the display device, the display device can regard the video signal received from the signal processor 100 as a video signal having a total of 1664 of horizontal dots and 1280 of horizontal effective pixels and can display it thereon. At this time, when the video signal is previously subjected by the low pass filter 111 provided in an output stage to a band limitation to ½ or less (for example, 45 MHz) of the sampling frequency of 107 MHz (which is equivalent to sampling with the clock CK received from the video signal processor), the display device can prevent aliasing noise caused by harmonics components therein.

With such an arrangement, since such horizontal pixel interpolating operation as necessary in a high-speed signal processing on a dot clock basis, increase in power consumption and involved heat generation can be prevented, and the circuit can be economically made small in size. Further, the horizontal interpolating operation based on the analog filter as well as the vertical interpolating operation based on digital signals enable realization of a high quality of pixel number conversion.

At this time, memory read clock is required to be changed according to the format of the input signal and the pixel number of the display device, but in the present invention, the clock is generated by J/K (J and K being natural numbers) multiplying a stable-frequency signal of a crystal oscillation circuit provided within the read control circuit 109 through the phase-locked loop (PLL), J and K being able to be set by an externally-provided control circuit (not shown). Alternatively, the clock CK to be sent to the display device may be generated by the crystal oscillator or the like and the memory read clock may be generated by the PLL. In any case, any arrangement can be employed, so long as the equation (1) is satisfied among the frequency frck of the memory read clock RCK, the frequency fck of the display dot clock CK to be sent to the display device, and the frequency fho of the horizontal synchronization signal HO to be sent to the display device.

When frck=85.6 MHz, N=1332, fck=107 MHz, M=1664 and fho=64.3 KHz as in the embodiment of FIG. 1 are substituted into the equation (1), the above relation-ship is confirmed to be satisfied as expressed by an equation (2) which follows.

$$85.6 \text{MHz}/1332 = 107 \text{MHz}/1664 = 64.3 \text{KHz} \quad (2)$$

In this case, the memory read clock frequency frck is the same as the conversion frequency of the D/A converter 110.

Figure 2:
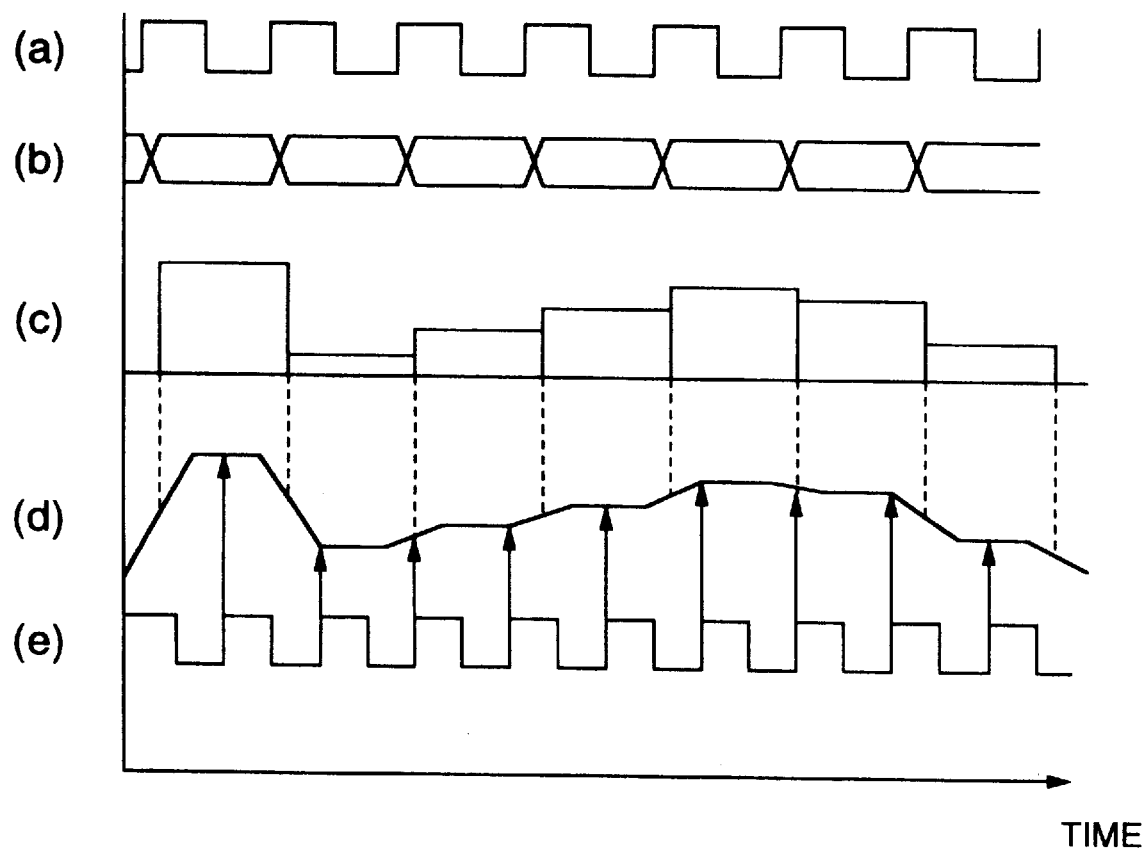
FIG. 2 is a flowchart for explaining the effects of a low pass filter for horizontal pixel number conversion.

Explanation will then be made as to the effect of the low pass filter 111 shown in FIG. 1 by referring to a waveform diagram of FIG. 2. In the drawing, (a) shows a memory read clock from the read control circuit 109, (b) shows a digital data input to the D/A converter 110, (c) shows an output analog signal received from the D/A converter 110, (d) shows a waveform of the output of the low pass filter 111, and (e) shows a display dot clock CK to be sent to the display device. The digital data (b) input to the D/A converter 110 on a clock basis of the clock (a) is converted to an analog signal having an amplitude indicative of its data value. The waveform of the output of the D/A converter 110 has such consecutive rectangular pulses containing many sharp edges as shown by (c). When the output signal of the D/A converter 110 is applied to the low pass filter 111, the edge parts in the signal are smoothed through its band limitation, as shown by (d). As a result, even when sampling is carried out with the display dot clock CK (e) having a frequency different from that of the memory read clock in the interior of the display device, a good interpolated output can be obtained without sampling the unstable data of the edge parts.

When the horizontal effective pixel number of the input video signal is larger than that of the display device, the filter operates as an anti-aliasing filter.

This low pass filter 111 may made up of such passive elements as inductance, capacitor and resistor. Or, the filter may comprise an active filter using a high-speed operational amplifier. Alternatively, the filter may comprises an active filter whose cut-off frequency can be externally controlled and whose characteristics can vary with the memory read clock RCK and the display dot clock CK.

The format of the input video signal is not restricted to the above one, but the pixel number, line number, etc. may be changed as necessary depending on the resister setting by an external control circuit. In this case, the horizontal and vertical interpolation and scaling factor are changed to convert the format to such a format as to allow the data to be always displayed on the display device.

For example, when it is desired to display an input signal of 640×480 pixels on a display device of 1280 horizontal display pixels or dots and 1024 display effective lines, the line number is changed to twice, 64 blanking lines are added, the memory read clock is set at 53.5 MHz (=107 MHz/2), to thereby provide a horizontally twice enlargement.

Although the output format of the video signal has been explained in connection with the 1280×1024 pixels, the present invention is not limited to the specific example. For example, in the case of a display device having another display pixel number, the format of the input video signal may be changed to a signal format suitable for the display device.

In this case, the characteristic of the output stage low pass filter is changed according to the display dot clock CK. Alternatively, when the characteristic of the low pass filter is previously determined based on the possible highest display dot clock CK, so that when the display pixel number is small, the vertical frequency is increased to make the display dot clock CK equal to the highest display dot clock CK, which results in that the input signal having a plurality of resolutions can be connected to and displayed on the display device with use of a single system of low pass filter.

Explanation will next be made as to how to generate the clock of the read control circuit 109 in FIG. 1.

Figure 3:
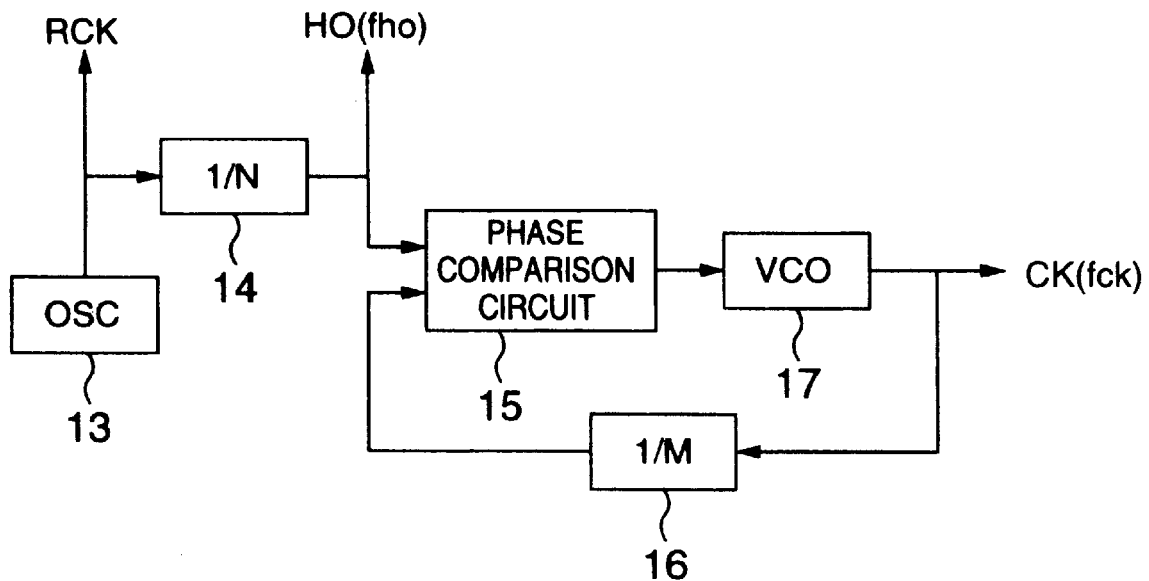
FIG. 3 shows an embodiment of a clock generator in a read control circuit.

Shown in FIG. 3 is an arrangement of a clock generator provided in the read control circuit 109.

The clock generator of FIG. 3 includes an oscillation circuit 13 such as a crystal oscillator for generating the memory read clock RCK, a frequency divider 14 for frequency-dividing the memory read clock RCK by N to generate the horizontal synchronization signal HO, a phase comparison circuit 15 for comparing the phase of an output of a frequency divider 16 with the phase of the horizontal synchronization signal HO, a voltage-controlled oscillator (VCO) 17 whose oscillation frequency is controlled by the phase comparison circuit 15, the frequency divider 16 serving to frequency-divide the display dot clock CK received from the voltage-controlled oscillator (VCO) 17 by M and to input it to the phase comparison circuit 15.

The memory read clock RCK generated by the oscillation circuit 13 is output to the memory 106, D/A converter circuit 110, etc. and is also output to the frequency divider 14 to be frequency-divided thereby to generate the horizontal synchronization signal HO. The read control circuit reads data from the memory 106 on a line basis with respect to the horizontal synchronization signal HO as a reference. The phase comparison circuit 15, voltage-controlled oscillator (VCO) 17 and frequency divider 16 form such a PLL that the output of the frequency divider circuit 16 applied to the phase comparison circuit 15 is equal to the horizontal synchronization signal HO with respect to frequency, with the result that the PLL operates with the synchronized phase. Thus, the frequency fck of the dot clock CK corresponds to M times the frequency fho of the output horizontal synchronization signal HO, and the signal HO in turn corresponds to N division of the read frequency frck, whereby a clock satisfying the conditions of the equation (1) can be generated.

Figure 4:
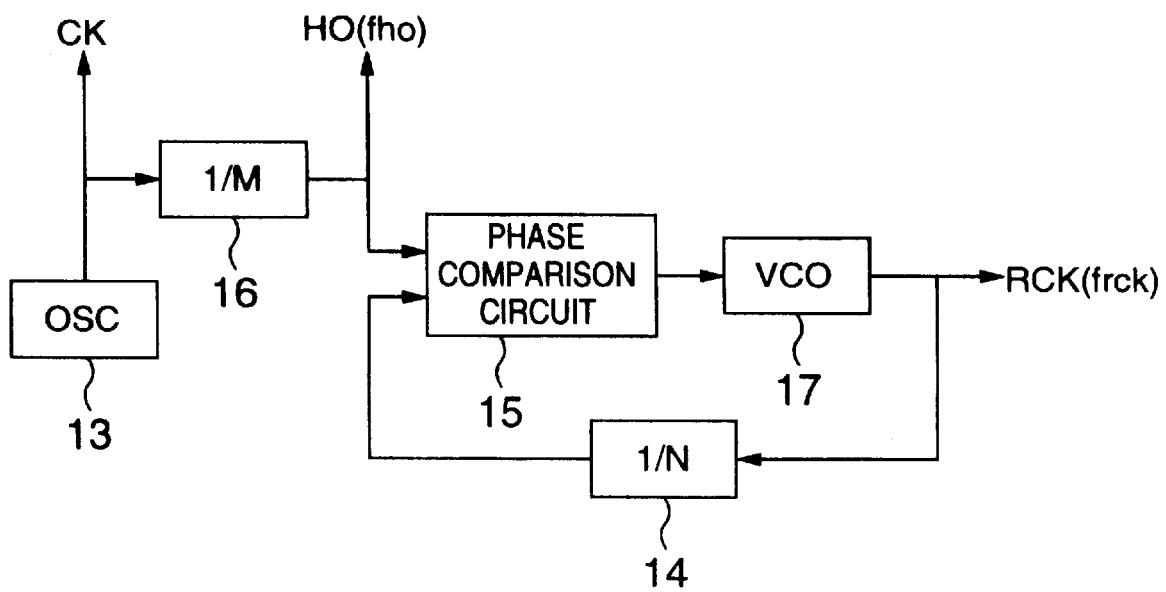
FIG. 4 shows another embodiment of the clock generator in the read control circuit.

Although the read clock RCK is generated by the frequency-fixed oscillator and the dot clock CK to be sent to the display device is generated by the PLL in the arrangement of FIG. 3, the dot clock CK to be sent to the display device may be generated by the frequency-fixed oscillator and the read clock RCK may be generated by the PLL, an example of which is shown in FIG. 4.

FIG. 4 is arranged so that the oscillation circuit 13 generates the display dot clock CK and the frequency divider 16 frequency-divides the clock CK by M to generate the horizontal synchronization signal HO. Through a PLL made up of the phase comparison circuit 15, voltage-controlled oscillator (VCO) 17 and frequency divider 14; the frequency frck of the read clock RCK is changed to a frequency corresponding to N times the frequency fho of the horizontal synchronization signal HO. As a result, similarly to FIG. 3, a clock satisfying the conditions of the equation (1) can be generated.

With such an arrangement as shown in FIG. 4, the display dot clock CK is set by an oscillation circuit such as a crystal oscillator to have always a constant frequency, so that, even when the format of the output video signal is changed, it is only required to lo change the vertical frequency and is unnecessary to change the characteristic of the low pass filter such as cut-off frequency in the foregoing arrangement example, whereby various formats of images can be displayed with use of a single system of filter. In this case, it is necessary to change the read clock RCK according to the format of the output video signal, which can be realized by changing a frequency division ratio N of the frequency divider circuit 14 in FIG. 4, while the frequency of the read clock RCK satisfies the conditions of the equation (1).

Next, another method for forming the clock generator in the read control circuit 109 will be explained by referring to FIG. 5.

Figure 5:
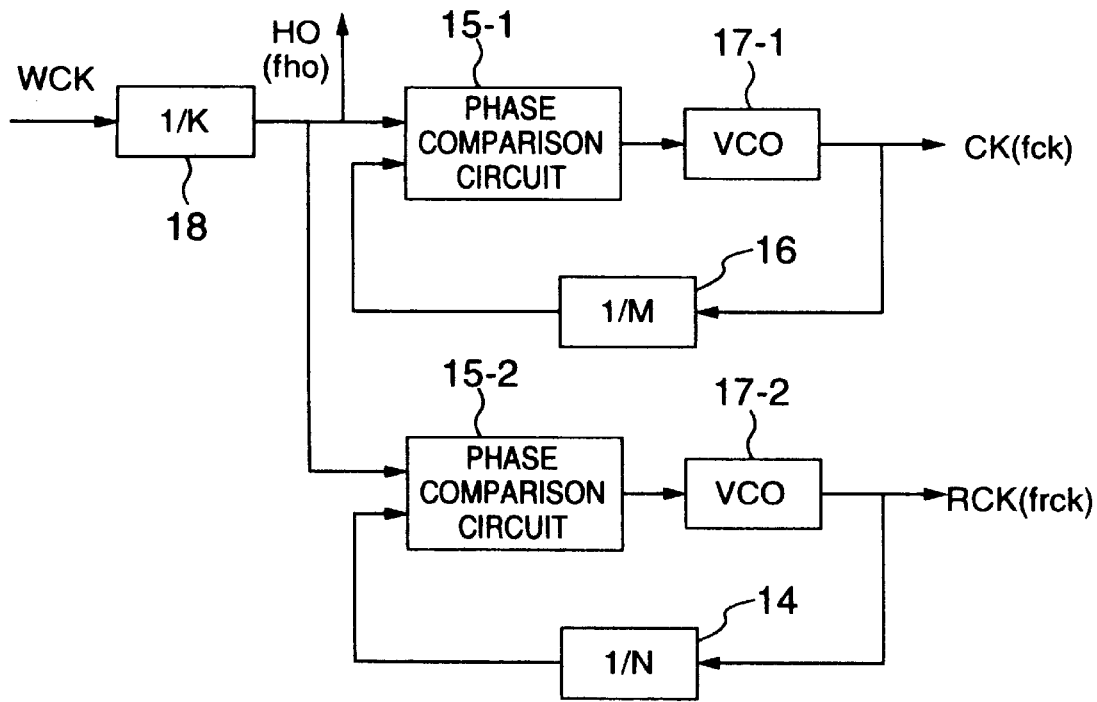
FIG. 5 a further embodiment of the clock generator in the read control circuit.

The circuit of FIG. 5 includes a frequency divider 18 for frequency-dividing a write clock WCK or another fixed clock signal to generate the horizontal synchronization signal HO, phase comparison circuits 15-1 and 15-2, voltage-controlled oscillators (VCOs) 17-1 and 17-2, and frequency divider 14 and 16 having frequency division ratios of N and M respectively. Through a PLL made up of the phase comparison circuit 15-1, voltage-controlled oscillator 17-1 and frequency divider 16; the frequency fck of the display dot clock CK is changed to a frequency corresponding to M times the frequency fho of the horizontal synchronization output signal HO. Similarly, through a PLL made up of the phase comparison circuit 15-2r voltage-controlled oscillator 17-2 and frequency divider 14; the frequency frck of the read clock RCK is changed to a frequency corresponding to N times the frequency fho of the horizontal synchronization output signal HO. As a result, as in FIGS. 3 and 4, a clock satisfying the conditions of the equation (1) can be generated.

In any of the cases of FIGS. 3, 4 and 5, the setting of the frequency division ratio of the frequency divider, the oscillation frequency range of the voltage-controlled oscillator etc. can be changed, that is, the setting change can be made by an externally-provided control circuit depending on the format of the input video signal or the contents of the signal processing.

Explanation will then be made as to the line interpolating circuit 108 in FIG. 1. The line interpolating circuit may comprise a conventional linear interpolating circuit but preferably comprise a line interpolating circuit using a nonlinear circuit to be explained below.

Figure 6:
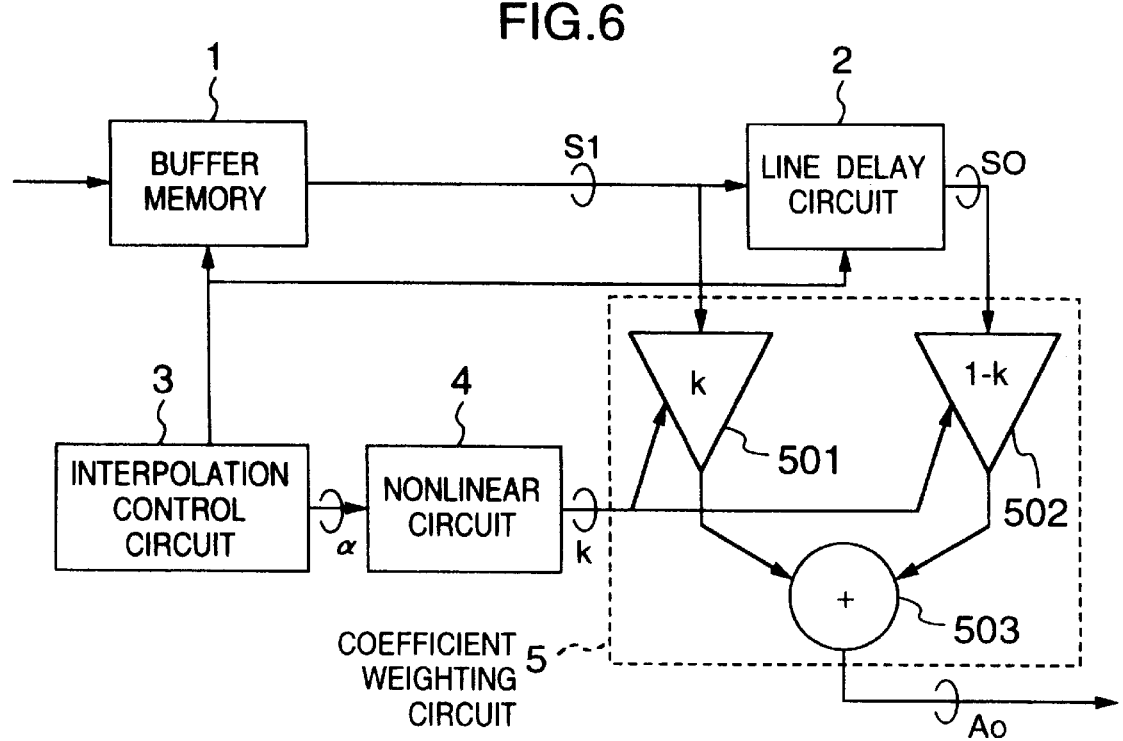
FIG. 6 shows an embodiment of a line interpolation circuit in the present invention.

Referring to FIG. 6, there is shown a block diagram of an embodiment of a vertical line interpolating circuit in the present embodiment, which includes a buffer memory 1 for storing therein digitized input pixel data, a one-line delay circuit 2 for delaying a signal S1 read out from the buffer memory 1 and outputting it as a signal S0, an interpolation control circuit 3 for performing control over interpolation by setting an enlarging factor, a nonlinear circuit 4 for converting a weight coefficient received from the interpolation control circuit 3 to a nonlinear weight coefficient k according to a nonlinear function, a coefficient weighting circuit 5 for obtaining a weighted average of the signals S1 and S0 with the nonlinear weight coefficients k and 1-k received from the nonlinear circuit 4, a coefficient circuit 501 for multiplying the input S1 by the nonlinear weight coefficient k received from the nonlinear circuit 4, a coefficient circuit 502 for multiplying the input S0 by the nonlinear weight coefficient 1-k, and an addition circuit 503 for adding together outputs of the coefficient circuits 501 and 502 and outputting the addition as an interpolated signal Ao.

An input video signal is stored in the buffer memory 1 as digital data. The buffer memory functions to accommodate a difference between data transmission rates caused by the pixel number conversion. The data S1 read out from the buffer memory is input to the one-line delay circuit 2 comprising a line memory or the like to allow simultaneous reference of the current target pixel data S0 and the pixel data S1 appearing one line later. The pixels of the data S0 and S1 are subjected by the coefficient weighting circuit 5 to the coefficient weighting operation with use of the nonlinear weight coefficient k received from the nonlinear circuit 4 to be output therefrom as the interpolated signal Ao which is expressed as follows.

$$Ao = S1 \cdot k + S0 \cdot (1-k) \quad (3)$$

where, $0 \leq k \leq 1$.

The weight coefficient a issued from the interpolation control circuit 3 is output as a value normalized so that a maximum distance between the line of the input signal S0 and a line to be interpolated (distance between the signals S0 and S1) is 1. For example, when it is desired to perform line interpolation at a position that a vertical distance ratio from the S0 is 3 and distance ratio from the S1 is 2, the interpolation control circuit 3 is arranged to output a weight coefficient α of 0.6 (=3/(3+2)). Though the weight coefficient α is used as it is (without being subjected to the nonlinear conversion) as the weight of the weighted mean in the coefficient weighting circuit 5 in the conventional linear interpolation system, the nonlinear characteristic of the nonlinear circuit 4 causes conversion to the nonlinear weight coefficient k in the present invention, as follows.

For a constant A satisfying a relation of $$0 < A < 0.5,$$

if a<A, then k=0
if A<α<1-A, then k=(α-A)/(1-2A)
if a>1-A, then k=
When A=0.25 as an example, the characteristic k is as follows.

$$\begin{rcases} \text{If } \alpha < 0.25, \text{ then } k = 0 \\ \text{If } 0.25 \leq \alpha \leq 0.75, \text{ then } k = 2\,(\alpha - 0.25) \\ \text{If } \alpha > 0.75, \text{ then } k = 1 \end{rcases} \quad (4)$$

By applying such nonlinear transformation, if the position of the interpolation pixel is close to S0 (α<0.25), then k=0; and S0 is output as it is as the interpolated signal Ao. If the position of the interpolation line is close to S1 (α>0.75), then k=1 and S1 is output as it is as the interpolated signal Ao. When it is desired to interpolate a line located nearly intermediate between S0 and S1 (0.25<α<0.75), k increases from 0 to 1 as a is increased, S0 and S1 are subjected to the weighted average with use of this nonlinearly transformed weight coefficient and are output as the interpolated signal Ao.

In this way, by applying the nonlinear function to the weight coefficient of the coefficient weighting circuit 5, when the distance to the interpolation line is close, a movement of a center of balance of the pixel is allowed to prevent deterioration of the resolution of the edge parts; whereas, when the interpolation line is separated away from the input pixel line (in the vicinity of a middle point between the 2 lines), with the weighted averaging operation, smoothly interpolated outputs without any deflection of a center of balance of the pixel are obtained. As a result, there can be realized a line number converting function with less resolution deterioration and with less remarked distortion in the graphics and character fonts.

Then explanation will be made as to the input/output characteristics of the nonlinear circuit 4 in FIG. 6, by referring to FIG. 7.

Figure 7:
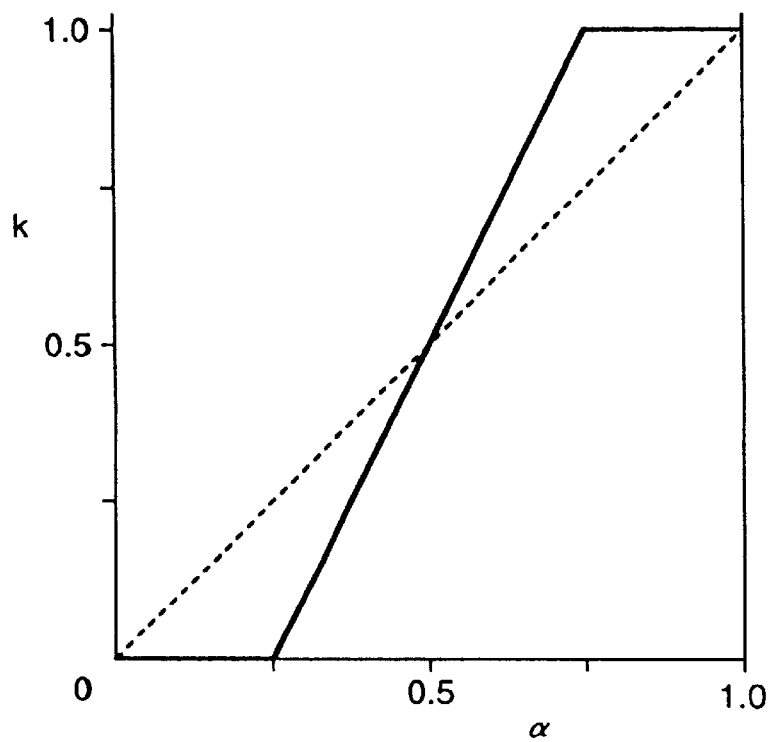
FIG. 7 is an input/output characteristic diagram of a nonlinear circuit in FIG. 6.

FIG. 7 is an input/output characteristic diagram showing a relationship of the value of an output k to an input α of the nonlinear circuit 4. The characteristic of the nonlinear circuit 4 is shown by a solid line in the drawing, whereas, a characteristic shown by a dotted line is a straight line for k=α and corresponds to a conventional characteristic based on the linear interpolation when the nonlinear circuit 4 is not used for comparison. As shown by the equation (4), the characteristic has 2 turn points at α=0.25 and α=0.75 and has a value k of 0 for α<0.25 and a value k of 1 for α>0.75 and linearly increases for $0.25 \leq \alpha \leq 0.75$.

The nonlinear circuit 4 can be easily implemented by preparing a look-up table with use of a read-only memory (ROM). That is, the input α is regarded as a ROM address and the value of the corresponding output k is previously written in the ROM as data.

Though two turn points are given for α=0.25 and α=0.75 in the equation (4) or in the characteristic of FIG. 7, the present invention is not limited to the specific example and the turn points may be given for α=0.3 and α=0.7. In this way, when the durations of the characteristic satisfying k=0 and k=1 are prolonged to steepen the slope of its central part of the characteristic curve, the characteristic of the interpolated output image becomes close to the characteristic of the nearest interpolation (previous-value hold interpolation) to thereby suppress reduction in the resolution of the edge parts. Or when the turn points are given at α=0.2 and α=0.8, the ratio subjected to the interpolation of the central straight part becomes higher, whereby there can be obtained a smooth interpolated image close to the linear interpolation characteristic. The intended effects of the present invention can be obtained so long as a nonlinear function k=f(α) meets conditions which follow.

$$f(0)=0 \tag{5}$$

$$f(1)=1 \tag{6}$$

$$f(\alpha)=1-f(1-) \tag{7}$$

$$f(\alpha) \leq \alpha \text{ for } 0<\alpha<0.5 \tag{8}$$

$$f(\alpha) \geq \alpha \text{ for } 0.5<\alpha<1 \tag{9}$$

The equation (7) shows a condition required to maintain vertical (or horizontal) homogeneity of the interpolated characteristic and means a characteristic symmetric with respect to a center of coordinates (α,k)=(0.5,0.5). The equation (8) shows a condition, when a distance to the interpolation pixel is small, required to make the weight coefficient smaller than that in the linear interpolation system to thereby suppress the resolution deterioration caused by the lo averaging operation.

Figure 8:
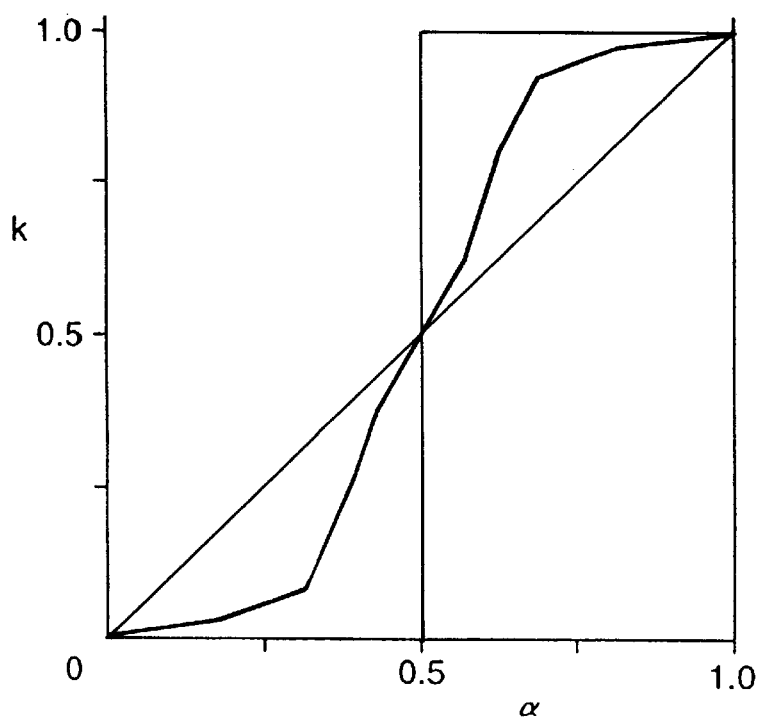
FIG. 8 is a diagram showing conditions of a nonlinear function.

The equation (9), which is also derived from the equations (8) and (7), shows a condition required to suppress the resolution deterioration. Another example of the nonlinear function satisfying the conditions of the equations (9), (8) and (7) is shown in FIG. 8. The characteristic curve is located within hatched zones in FIG. 8. When the characteristic curve is symmetric with respect to a point of coordinates (α,k)=(0.5,0.5), the conditions of the equations (9), (8) and (7) can be satisfied. Any nonlinear function may be employed in the present invention, so long as it meets these conditions, which conforms to the subject matter of the present invention.

When the nonlinear function is applied to the weight coefficient in this way, there can be realized a pixel number converting function with less resolution deterioration and with less remarked distortion of graphics and character fonts.

Explanation will next be made as to the arrangement of the interpolation control circuit 3 in FIG. 6, with reference to a block diagram of FIG. 9.

The circuit of FIG. 9 includes a register 301 for setting data for control of an enlarging factor, an addition circuit 302 for adding together a set value of the setting register 301 and an output of a D flip-flop array circuit 303 acting to latch an output of the addition circuit 302 with the horizontal synchronization pulse signal HO, and a coefficient calculation circuit 304 for calculating the weight coefficient based on a interpolation distance DIS received from the D flip-flop array circuit 303. The setting register 301, addition circuit 302 and D flip-flop array circuit 303 are of an 8 bit type. Lower 8 bits of an addition output of the addition circuit 302 neglecting a carry signal are input to the D flip-flop array circuit 303, and the carry signal (9-th bit) is waveform-shaped and is output as the data read clock RCK from the buffer. The addition operation neglecting the carry means to perform addition with modulus 256 to show a residue obtained by dividing the arithmetic operation result by 256. The addition result as the output of the addition circuit 302 is delayed by the D flip-flop array circuit 303, and the output of the D flip-flop array circuit 303 is further added to the set value of the setting register 301, so that sequential cumulative addition is carried out by performing addition with modulus 256 over the register set value.

Explanation will next be made as to the operation of the interpolation control circuit 3 in FIG. 6, by referring to FIGS. 10A and 10B. Numbers 1, 2, 3 . . . in Fig. 10A represent input lines and a distance between the lines is 256. When it is desired to convert (increase) the number of input pixels to ⁴⁄₃ times, interpolation lines are generated at intervals of 192 (=256×¾) as shown by a, b, c . . . in FIG. 10B. In order to perform such control, the interpolation output interval 192 is set in the setting register 301 in FIG. 6 to perform sequential cumulative addition. The cumulative addition output DIS indicates a distance between the interpolation line S0 and interpolation line, e.g., 0, 192, 128, 64, . . . , the coefficient calculation circuit 304 generates the weight coefficient on the basis of the received signal DIS. When the cumulative addition result exceeds 256 and carry takes place, a line update signal HINC generated from the carry signal causes data to be updated on a line basis from the buffer, thus updating the S0 and S1. The new S0 and S1 as well as lower 8 bits of the cumulative addition output can be used to generate an interpolation line.

Explanation will then be made as to the operation of the coefficient calculation circuit 304 in FIG. 9, with reference to FIGS. 11A, 11B, 11C and 11D. FIGS. 11A, 11B, 11C and 11D are examples of an input/output characteristic of the coefficient calculation circuit showing a relationship of the output interpolation coefficient to the input value DIS.

Figure 11A:
FIGS. 11A, 11B, 11C and 11D are graphs showing relationships between interpolation distance and weight coefficient.

FIG. 11A shows the operation of the coefficient calculation circuit when arranged so that the coefficient linearly varies from 0 to 1.0 as the DIS is increased from 0 to 255.

Figure 11B:
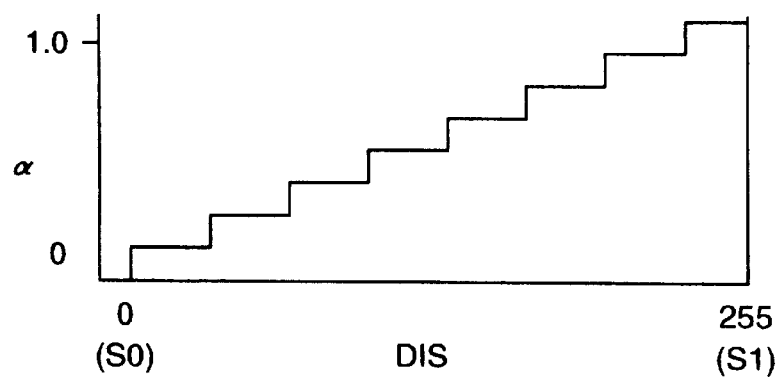

Since the number of gray levels recognizable by human is generally about 100 to 200, a video signal is, in many cases, represented by about 8 bits (R, G, B or Y, R-Y, B-Y respectively independently). For this reason, after subjected to an interpolating operation, the video signal is rounded eventually to about 8 bits, so that, even when interpolation coefficient is controlled in relatively rough steps, this has a less effect on image. Thus, the input/output characteristic of the coefficient calculation circuit 304 when the interpolation coefficient is controlled in 8 steps is shown in FIG. 11B. The interpolation coefficient α is controlled in 8 steps of 0, ⅛, ²⁄₈ (=¼), ⅜, ⁴⁄₈ (=½), ⅝, ⁶⁄₈ (=¾), ⅞ and ⁸⁄₈ (=1). Such an arrangement results in that the number of control bits of the coefficient circuit is reduced from 8 to 3 and the circuit scale is reduced, there can be realized a processor which is made small in size, low in cost and high in image quality.

In this connection, the number of steps is not limited to the specific 8, but it may be arbitrarily set. When the step number is set at the power of 2, however, the structure of the coefficient circuit can be simplified with a combination of bit shift and adder.

In order to realize such a discrete output characteristic, it is merely required to set lower bits of the coefficient calculation circuit 304 at zero. More specifically, lower 5 of the 8 bits are all set at zero to be neglected and only the upper 3 bits are used to obtain 8-step discrete coefficients.

Figure 11C:
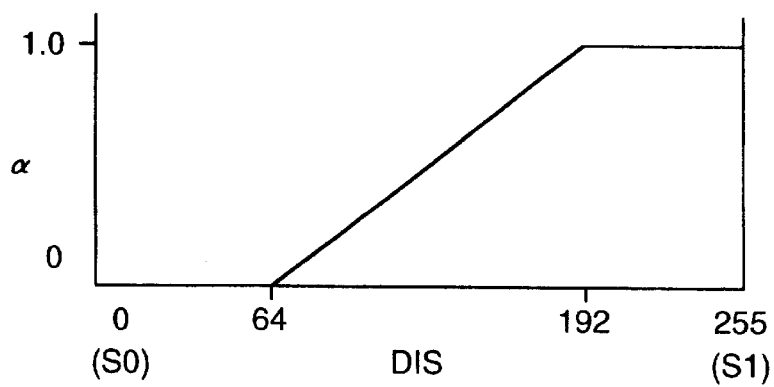

FIG. 11C shows an input/output characteristic in which α=0 in a DIS range of 0 to 63, α=1 in a DIS range of 192 to 255, and a varies linearly in a DIS range of 64 to 191.

Figure 11D:
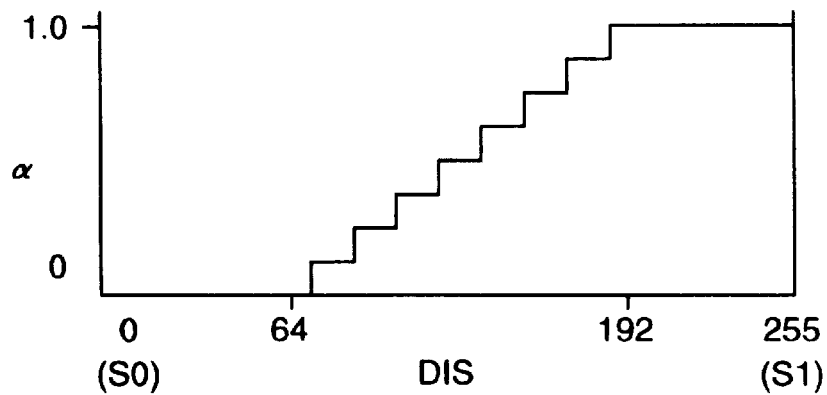

In FIG. 11D, α stepwise varies in a DIS range of 64 to 192 in FIG. 11C. That is, α is controlled in an 8 steps of 0, ⅛, 2/8 (=¼), ⅜, 4/8 (=½), ⅝, 6/8 (=¾), ⅞ and 8/8 (=1).

Although α=0 in the DIS range of 0 to 63, α=1 in the DIS range of 192 to 255, and varies linearly in the DIS range of 64 to 191 in the operational characteristic of FIG. 11C; the present invention is not restricted to the specific example. For example, α may be 0 in the vicinity of the value of the DIS of 0, α may be 1 in the vicinity of the value of the DIS of 255, and may linearly vary in the vicinity of an intermediate value of the DIS.

As mentioned above, the enlarging operation of (256/N) times can be carried out based on the numeral value N set in the setting register 301. Though the setting register 301, addition circuit 302 and D flip-flop array circuit 303 have been of an 8 bit type in the arrangement of FIG. 6, the present invention is not limited to the specific example. For example, the arrangement of FIG. 6 may be of a 7 or 10 bit type. When the number of such bits is decreased, the circuit scale can be reduced. Further, an increase in the number of bits enables the enlarging factor to be set on a finer unit basis.

Figure 12:
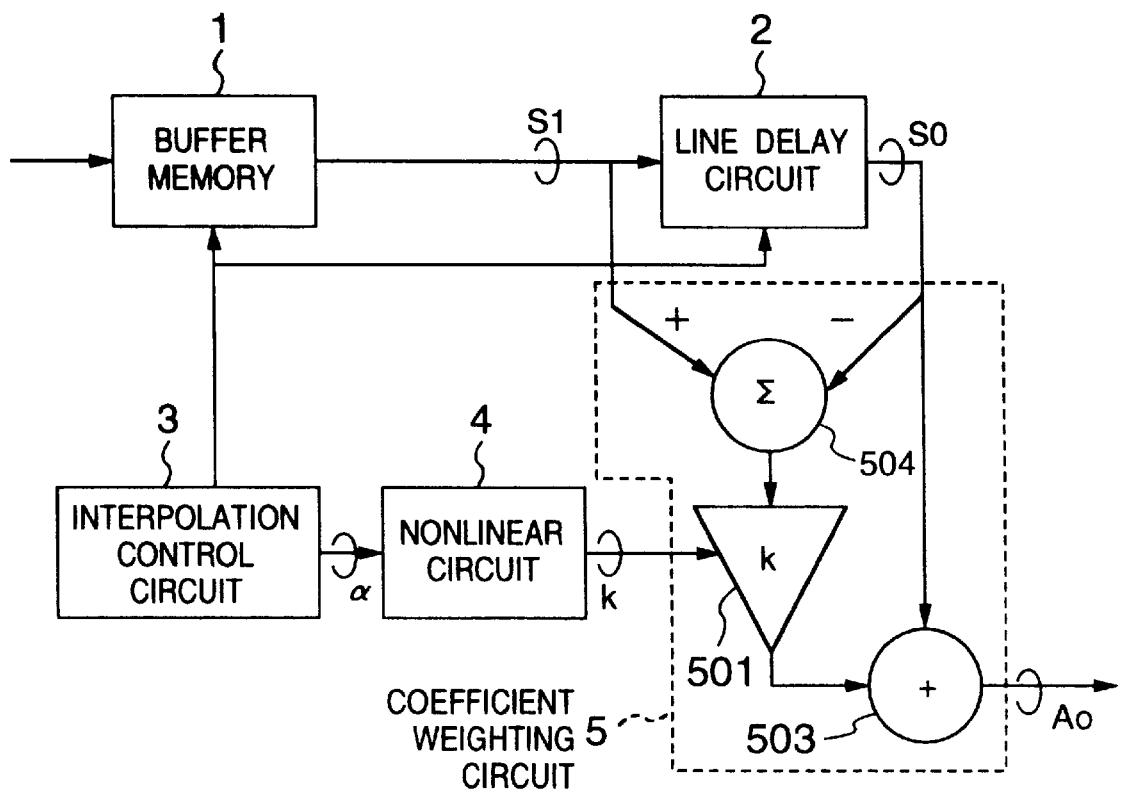
FIG. 12 is another embodiment of the interpolation control circuit in FIG. 6.

Shown in FIG. 12 is another embodiment of the interpolation control circuit 3.

An arrangement of FIG. 12 corresponds to the coefficient weighting circuit 5 in FIG. 6 but which interior structure is modified. Other arrangement is substantially the same as that in FIG. 6. Explanation will be made as to the interior structure of the coefficient weighting circuit 5.

In the operation of the coefficient weighting circuit 5 arranged as shown in FIG. 6, the coefficient weighting circuit outputs the interpolated output line signal Ao in accordance with the equation (1) using the nonlinear weight coefficient k converted by the nonlinear circuit. Reduction of the equation (1) to arrange it with respect to terms associated with the coefficient k results in an equation which follows.

$$Ao=k\cdot(S1-S0)+So \quad (10)$$

The arrangement of the coefficient weighting circuit 5 in FIG. 12 is based on the equation (10). In the arrangement, more in detail, a signal (S1–S0) is calculated by a subtraction circuit 504, multiplied by a coefficient circuit 501 by the coefficient k, and then added by an addition circuit 503 to the signal S0 to be thereby output as the interpolated output signal Ao. That is, since the equation (1) is equivalent to the equation (10), even use of the coefficient weighting circuit 5 shown in FIG. 12 can produce effects similar to in the embodiment of FIG. 6.

When compared with the arrangement of FIG. 6, the addition/subtraction circuit is increased to 2 but the number of the control circuits is reduced to 1. A coefficient circuit for performing multiplying operation is, generally speaking, larger in scale than a subtraction circuit, so that, when the circuit is implemented with the arrangement of FIG. 12, the circuit scale can be made small in size.

Although the number of only vertical lines has been converted in both of the embodiments of FIG. 6 and 12, the present invention can be applied also to the conversion of the number of horizontal pixels. In the latter case, the one-line delay circuit 2 in FIG. 6 or 12 is replaced by a sample delay circuit to obtain an interpolated pixel output with use of data between adjacent pixels. Further, the interpolation control circuit 3 of FIG. 9 is arranged so that the horizontal synchronization pulse HO is replaced by the dot clock DCK and the line update signal HINC is replaced by the read clock RCK of the buffer memory 1.

When this is combined with the converting operation of the number of horizontal lines, there can be effected such two-dimensional processing as enlargement of the entire display screen or aspect ratio conversion. An embodiment in which the present invention is applied to the conversion of the numbers of horizontal and vertical pixels will next be explained by referring to FIG. 13.

Figure 13:
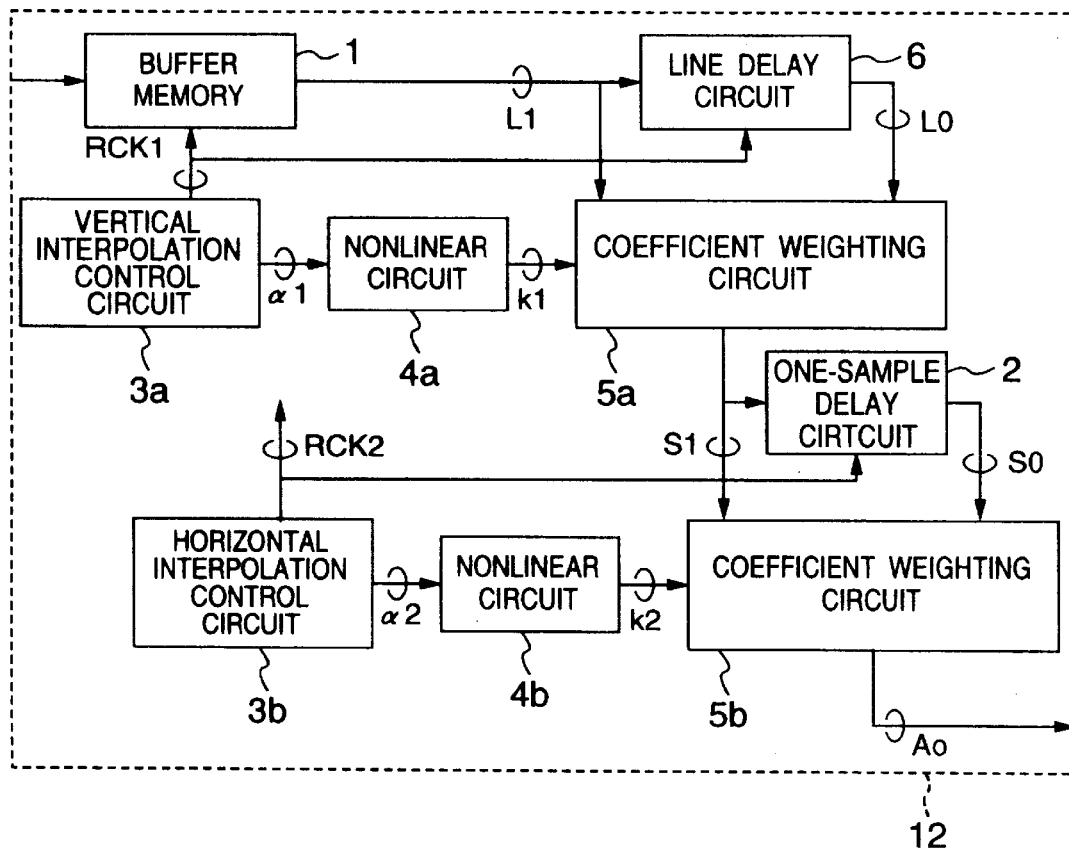
FIG. 13 is an embodiment of a pixel interpolating circuit in the present invention.

In FIG. 13, reference numeral 12 denotes an example of circuit for performing the 2-dimensional pixel interpolating operation in accordance with the present invention. The circuit 12 includes a buffer memory 1 for storing therein digitized input pixel data, a line memory 6 for delaying a signal L1 read out from the buffer memory by one line and outputting it, a vertical interpolation control circuit 3a for performing control based on setting of a vertical enlarging factor, a nonlinear circuit 4a for transforming a weight coefficient al received from the vertical interpolation control circuit 3a into a nonlinear weight coefficient k1 in accordance with a nonlinear function, a coefficient weighting circuit 5a for performing weighted average of the signals L1 and L0 with use of the nonlinear weight coefficients k1 and (1−k1) received from the nonlinear circuit 4a, a one-sample delay circuit 2 for delaying by one sample the signal S1 received from the coefficient weighting circuit 5a and outputting it as an output signal S0, a horizontal interpolation control circuit 3b for performing control operation based on setting of a horizontal enlarging factor, a nonlinear circuit 4b for transforming a weight coefficient α2 received from the horizontal interpolation control circuit 3b into a nonlinear weight coefficient k2 in accordance with a nonlinear function, and a coefficient weighting circuit 5b for performing weighting average of the signals S1 and S0 with use of the nonlinear weight coefficients k2 and (1−k2) received from the nonlinear circuit 4b and outputting a weighted average result as an interpolated signal.

In the arrangement of FIG. 13, a vertical interpolating circuit made up of the line memory 6, coefficient weighting circuit 5a, nonlinear circuit 4a and vertical interpolation control circuit 3a is connected in cascade with a horizontal interpolating circuit made up of the one-sample delay circuit 2, coefficient weighting circuit 5b, nonlinear circuit 4b and horizontal interpolation control circuit 3b. The buffer memory 1 functions to accommodate a difference in data transmission rate caused by the conversion of the numbers of horizontal and vertical pixels and the conversion of the number of lines, and is commonly used as both vertical and horizontal interpolation buffers. The data L1 issued from the buffer memory 1 is one-line delayed by the line memory 6 and then output therefrom as the signal L0. As a result, the signals L0 and L1 become vertically adjacent pixels and, when the signals are subjected to the weighting averaging operation with use of the nonlinear weight coefficient k1 received from the nonlinear circuit 4a, vertically interpolated data corresponding to one line can be obtained. This is different from the horizontally interpolating operation used so far, that is, the weight coefficient al and nonlinear weight coefficient k1 are held during one line and updated whenever the line is changed. A control signal RCK1 issued from the vertical interpolation control circuit 3a is for controlling the data update on a line basis. When this signal is not issued, the data of the identical line is repetitively output.

The data update of the buffer memory 1 and line memory 6 on a sample basis is controlled by a control signal RCK2 issued from the horizontal interpolation control circuit 3b.

The output signal S1 of the coefficient weighting circuit 5a after subjected to the vertical interpolating operation is one-sample delayed by the one-sample delay circuit 2 so that the pixels S0 and S1 horizontally adjacent on the display screen can be simultaneously referred to. As in the exemplary circuits of FIGS. 6 and 12, the 2 adjacent pixels are subjected by the coefficient weighting circuit 5b to a horizontal interpolating operation with use of the nonlinear weight coefficient k2 received from the nonlinear circuit 4b and then output as an interpolated signal.

The characteristics of the nonlinear circuits 4a and 4b are set as shown in FIG. 7, as in the embodiments of FIGS. 6 and 12.

With such an arrangement, the 2-dimensional operations including the enlargement of the entire display screen and the conversion of aspect ratio can be realized with less resolution deterioration and high image quality while suppressing distortion in graphics and character fonts. Further, the horizontal nonlinear characteristic may be different from the vertical one. For example, video signals of raster scans are made vertically discrete by scanning lines and tend to be susceptible to deterioration even when the vertical interpolation characteristic is close to the nearest (previous-value hold) interpolation characteristic. In the light of such characteristic, the vertical interpolation nonlinear characteristic is set to have turn points when $\alpha=0.3$ and $\alpha=0.7$, while the horizontal interpolation nonlinear characteristic is set to have turn points when $\alpha=0.25$ and $\alpha=0.75$. With such an arrangement, there can be realized a pixel number converting circuit which avoids deterioration of resolution caused by the vertical interpolation and produces a high quality of image. In this connection, the order of the horizontal and vertical interpolation circuits may be reversed as necessary.

Figure 14:
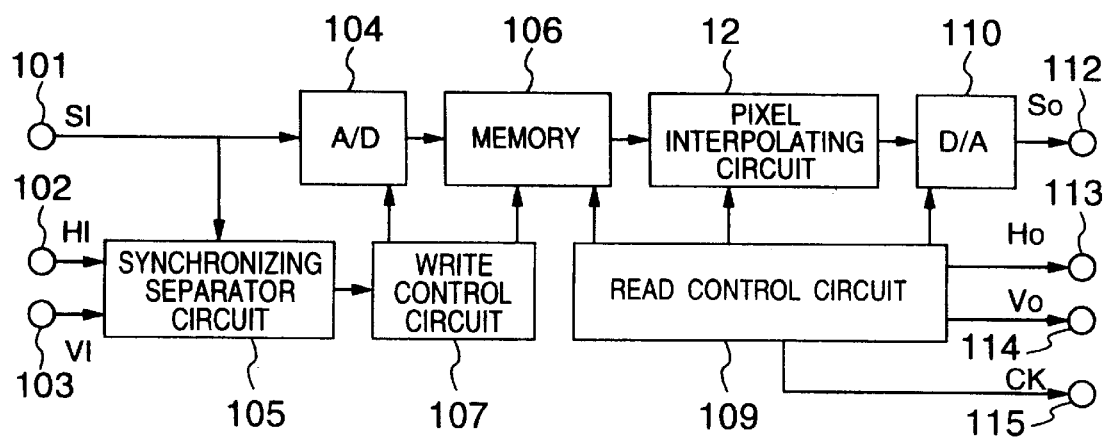
FIG. 14 is a block diagram of a video signal processor using the pixel interpolating circuit of FIG. 13.

Explanation will then be made as to an example of an arrangement of a signal processor which uses the pixel interpolating circuit 12 of FIG. 13 to convert signals of various image formats to signals conforming to such a display device of a fixed pixel number type as a liquid crystal display, by referring to a block diagram of FIG. 14.

In FIG. 14, the line interpolating circuit 108 in FIG. 1 has such an arrangement as shown in FIG. 13 and the low pass filter 111 and change-over switch 116 are not provided. Other constituent elements are the same as those in FIG. 1.

A video signal input from the terminal 101 is converted by the A/D converter 104 to digital data and then written in the memory 106. At this time, a sampling clock used in the A/D converter 104 is generated by a phase-locked loop (PLL) in the write control circuit 107 on the basis of a horizontal synchronization signal received from the synchronizing separator circuit 105, and the effective zone of the video signal is written in the memory 106.

The read control circuit 109, which incorporates an oscillation circuit such as a crystal oscillator for outputting a stable frequency, generates a horizontal synchronization signal HO, a vertical synchronization signal VO and a clock CK for display of the video signal on a display device of a fixed pixel number type. Under control of the control signals received from the read control circuit 109, the data within the memory 106 is converted by the pixel interpolating circuit 12 with respect to the numbers of lines and pixels, converted by the D/A converter 110 to an analog signal, and then output from the terminal 112 as an output video signal SO. Further, the read control circuit 109 outputs, in addition to the horizontal synchronization signal HO and vertical synchronization signal VO, a clock CK for the display device requiring the dot clock, the clock CK being output from the terminal 115.

With such an arrangement, for example, a display signal of 1024 pixels×768 lines can be displayed as enlarged fully on the screen of a display device of a fixed pixel number type of 1280 pixels×1024 lines such as a liquid crystal display. Such processing is realized, for example, by the pixel interpolating circuit 12 which performs horizontal enlarging operation of 1.25 times (1024×1.25=1280) and vertical enlarging operation of 1.333 times (768×1.333=1024). Or this is realized, for the purpose of keeping a horizontal/vertical aspect ratio, by performing horizontal and vertical enlarging operations of both 1.25 times and by adding 64 blanking lines to vertical lines.

The memory 106 writes therein the effective zone of the input signal on a field basis and converts it with respect to field frequency. The memory 106 may be commonly used also as the buffer memory 1 in the pixel interpolating circuit 12 of FIG. 13. At this time, the reading operation from the memory 106 on a line basis is carried out according to the signal RCK1 received from the vertical interpolation control circuit 3a within the pixel interpolating circuit 12 of FIG. 13, while the reading operation on a dot basis is carried out according to the signal RCK2 received from the horizontal interpolation control circuit 3b. In this way, the common use of the memory enables reduction of the circuit scale.

With such an arrangement as mentioned above, even when the input signal does not coincide with the number of pixels required in a display device, the pixels can be number-converted and displayed without remarked deterioration of image quality. In this connection, the order of the memory 106 and the pixel interpolating circuit 12 in FIG. 14 may be reversed as necessary.

Although the conversion of the number of display pixels and the conversion of field frequency have been made in the explanation of the operation of FIG. 1, the respective control circuits may control their addresses to the memory or make the read clock frequency different from the write clock frequency in the course of writing and reading these data, thus realizing various image processings including scaling of image size.

In the embodiment of FIG. 1, a single system of video signal has been processed. Explanation will next be made as to an embodiment when 3 systems of color signals of red (R), green (G) and blue (B) are processed, by referring to a circuit arrangement of FIG. 15.

Figure 15:
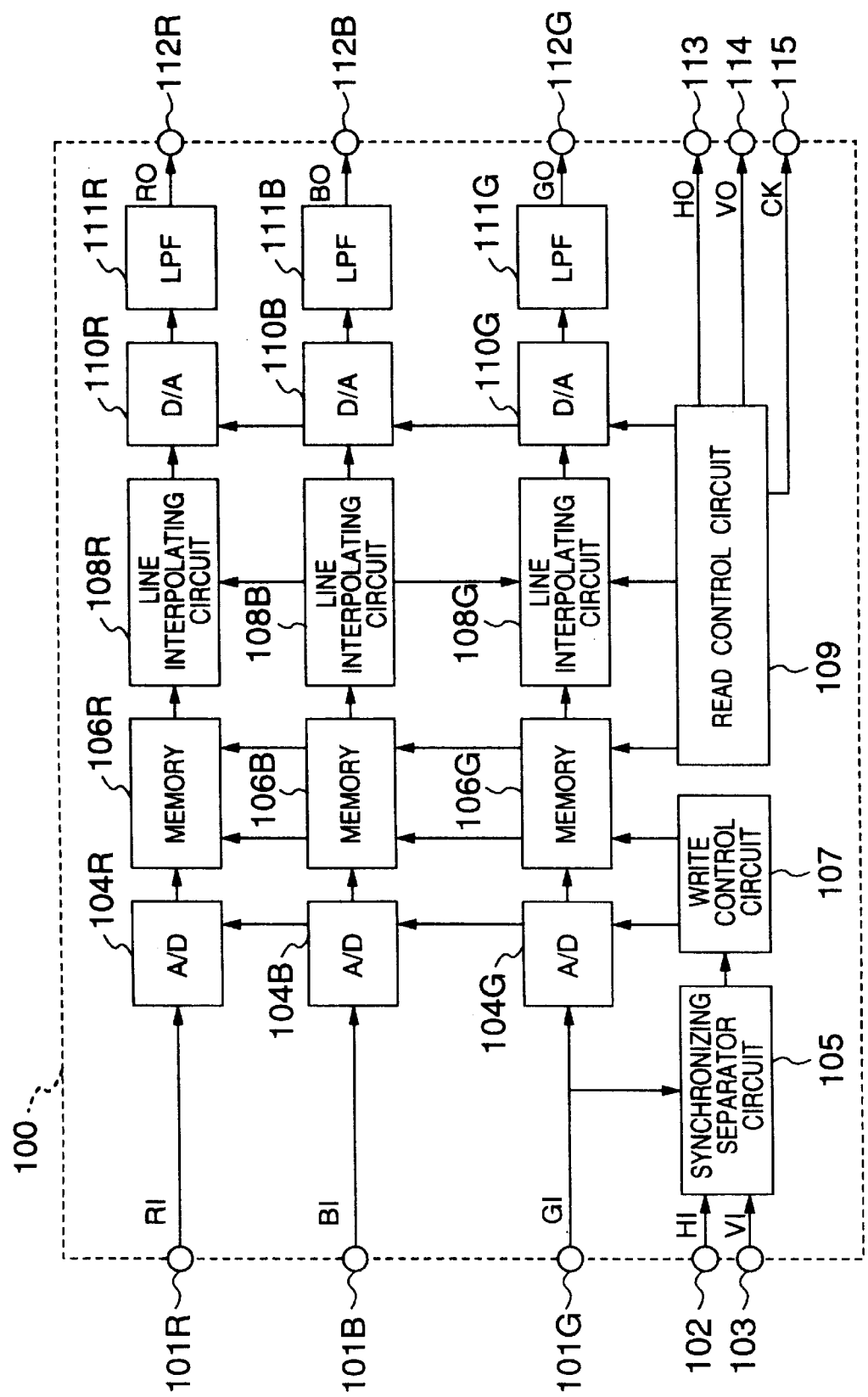
FIG. 15 is an example when the circuit of FIG. 1 is applied to a RGB signal processing circuit.

The circuit of FIG. 15 comprises 3 R, G and B systems each of which includes the video signal input terminal 101, A/D converter 104, memory 106, line interpolating circuit 108, D/A converter 110, low pass filter 111 and video signal output terminal 112 in FIG. 1. However, the change-over switch 116 is omitted herein.

The interior structures of the respective R, G and B systems are the same, and the constituent elements of the respective systems have the same reference numerals but added with R, G and B respectively.

A/D converters 104R, 104B, 104G, memories 106R, 106B, 106G, line interpolating circuits 108R, 108B, 108G, and D/A converters 110R, 110B, 110G are controlled by the write control circuit 107 and read control circuit 109 common to the R. G and B systems. Applied to the synchronizing separator circuit 105 is, in addition to synchronization input signals HI and VI independently of the video signal, a G input signal GI from a terminal 101G to cope with the synchronization signal multiplexed with a G signal. Other arrangement is substantially the same as that of FIG. 1. With such an arrangement as mentioned above, even color video signal including 3 signals of the R, G and B systems can be processed in substantially the same manner as in the foregoing embodiments.

When the numbers of horizontal and vertical effective pixels in the input video signal coincide with those of the display device, data sampled by the A/D converter 104 is not subjected to any interpolating operation and output to the display device in a 1:1 relationship. In such a case, changeover switches 116R, 116G and 116B are provided for bypassing the low pass filters 111R, 111G and 111B.

Figure 16:
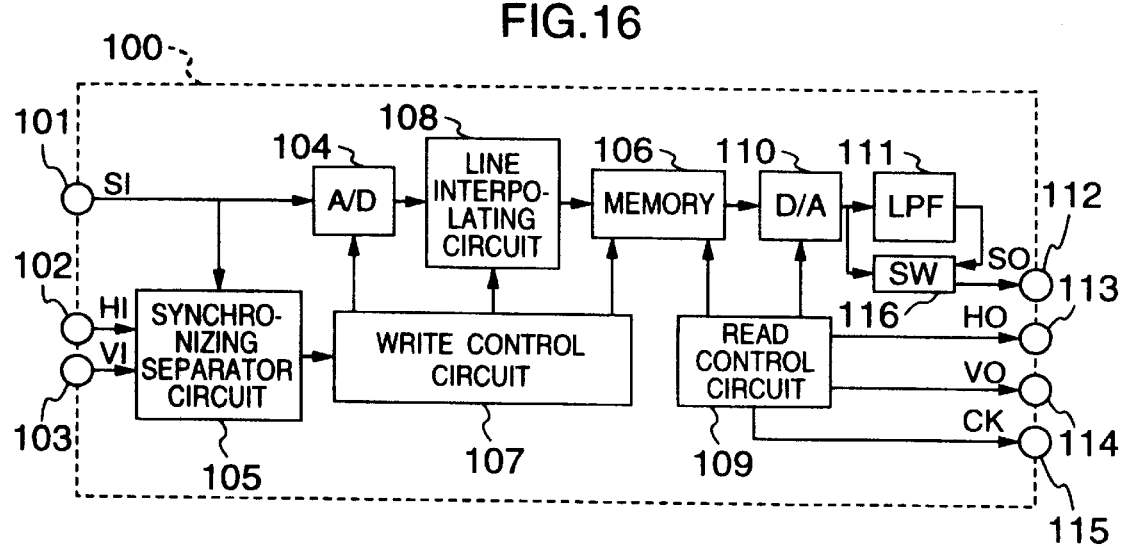
FIG. 16 is a block diagram of another embodiment of the video signal processor of the present invention.

Shown in FIG. 16 is another embodiment of the video signal processor 100.

The arrangement of FIG. 16 is different from that of FIG. 1 in that the order of the memory 106 and line interpolating circuit 108 is reversed.

That is, digital data issued from the A/D converter 104 is subjected by the line interpolating circuit 108 to a line number conversion and then written in the memory 106. Since the line number conversion is carried out at the stage of writing it in the memory, the line interpolating circuit 108 is controlled by the write control circuit 107. Since the data written in the memory 106 is already subjected to the line number conversion, when it is desired to read the data from the memory 106, it is only required to convert the clock frequency to conform to the horizontal pixel number of a display device. With such an arrangement, when the number of effective lines of an input video signal is larger than that of the display device, the necessary capacity of the memory 106 can be made small. That is, at this time, the memory 106 performs vertical band limiting and line decimating operations.

In the foregoing embodiments, the video signal processor of the present invention has been provided independently of the display device. Explanation will next be made as to an embodiment in which the video signal processor of the present invention is built in a display device, with reference to FIG. 17.

Figure 17:
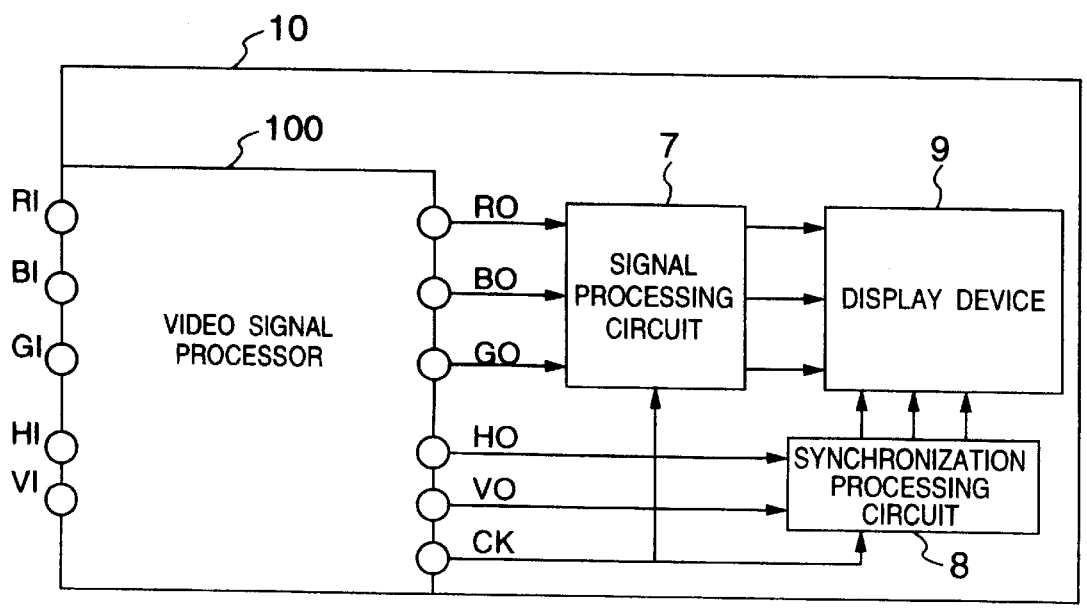
FIG. 17 shows an embodiment of a display device in which the video signal processor of the present invention is provided.

In FIG. 17, reference numeral 100 denotes a video signal processor of the present invention, numeral 10 denotes a display device, 9 denotes a display device of a fixed display pixel number type such as a liquid crystal display or a plasma display, 7 denotes a signal processing circuit for converting to signals necessary for the display device 9, and 8 denotes a synchroni- zation processing circuit for horizontal and vertical scan.

Video signals RO, BO and GO processed by the video signal processor 100 of the present invention are subjected by the signal processing circuit 7 to conversion of voltages or currents necessary to operate the display device 9. A horizontal synchronization signal HO, a vertical synchronization signal VO and dot clock CK issued from the video signal processor 100 are applied to the synchronization processing circuit 8 to be processed to cause horizontal and vertical scan of the display device 9. More specifically, in the liquid crystal or plasma display device, driver operations are performed to determine X and Y coordinates.

With the aforementioned arrangement, incorporation of the video signal processor within the display apparatus can advantageously economically eliminate the need for provision of an independent power supply and casing. In particular, the video signal processor of the present invention performs its operation in a 1:1 relationship to the display device, so that the incorporation of the signal processor in the display device enables the suppression of increase in the number of wiring lines, thus realizing a display device having a high level of function.

It should be appreciated that the intention is not to limit the invention only to these embodiments shown but rather to include all alternations, modifications and equivalent arrangements possible within the scope of appended claims.

What is claimed is:

1. A video signal processor, comprising:

a line number conversion unit which converts a number of lines in a digitized video signal;

a dot clock generator which generates a display dot clock having a predetermined frequency;

a data output unit which outputs analog pixel data subjected to a line number conversion and having a frequency different from said predetermined frequency of said display dot clock;

a data smoothing unit which smooths said analog pixel data; and a synchronization signal generator which generates horizontal and vertical synchronization signals to be sent to a display device;

wherein said line number conversion unit comprises:
 means for referring to signals of adjacent two lines;
 calculation means for calculating an interpolation distance between said signals of said adjacent two lines and an interpolation line produced for a line number conversion;
 conversion means for converting said interpolation distance in accordance with a non-linear function of the following conditions:
 when an amplitude of an input signal (x) is normalized from 0 to 1.0, a converted output signal $f(x)(0 \leq f(x) \leq 1.0)$ takes values as follows,
 when x=0, f(0)=0,
 when x=0.5, f(0.5)=0.5,
 when x=1.0, f(1.0)=1.0, and f(x) satisfies
 $f(x)=1-f(1-x)(0<x<0.5)$,
 $f(x) \leq x (0<x<0.5)$; and
 interpolation means for producing an interpolation signal by effecting a weight mean of said signals of said adjacent two lines on a basis of said interpolation distance converted in accordance with said non-linear function.

2. A video signal processor comprising:

a line number conversion unit which converts a number of lines in a digitized video signal;

a dot clock generator which generates a display dot clock having a predetermined frequency;

a data output unit which outputs analog pixel data subjected to a line number conversion and having a frequency different from said predetermined frequency of said display dot clock;

a data smoothing unit which smooths said analog pixel data; and a synchronization signal generator which generates horizontal and vertical synchronization signals to be sent to a display device;

wherein said line number conversion unit comprises:
 means for referring to signals of adjacent two lines;
 calculation means for calculating an interpolation distance between said signals of said adjacent two lines and an interpolation line produced for a line number conversion;
 conversion means for converting said interpolation distance in accordance with a non-linear function of the following conditions:
 when an amplitude of an input signal (x) is normalized from 0 to 1.0, a converted output signal $f(x)(0 \leq f(x) \leq 1.0)$ satisfies the following conditions for a constant number A which satisfies 0<A<0.5,
 when $0 \leq x \leq A$, f(x)=0, when $A \leq x \leq (1-A)$, $f(x)=(x-A)/(1-2A)$,
when $(1-A)<x\leq(1.0)$, $f(x)=1.0$; and interpolation means for producing an interpolation signal by effecting a weight mean of said signals of said adjacent two lines on a basis of said interpolation distance converted in accordance with said non-linear function.

3. A video signal processor as claimed in claim 2, wherein said constant number A satisfies $0.2 \leq A \leq 0.3$.

4. A video signal processor which performs an interpolation processing upon a video signal separated in a pixel unit and outputs a video signal in one dimensional form formed by a horizontal and vertical scanning means, said video signal processor comprising:

hold means for a plurality of pixels of an original image input from a buffer memory;

means for calculating an interpolation distance between a pixel position of an interpolation output pixel;

control means for controlling said hold means on the basis of said interpolation distance;

conversion means for non-linearly converting said interpolation distance in accordance with a non-linear function of the following conditions:

when an amplitude of an input signal (x) is normalized from 0 to 1.0, a converted output signal $f(x)(0\leq f(x) \leq 1.0)$ takes values as follows,
when $x=0$, $f(0)=0$,
when $x=0.5$, $f(0.5)=0.5$,
when $x=1.0$, $f(1.0)=1.0$, and $f(x)$ satisfies
$f(x)=1-f(1-x)$ $(0<x<0.5)$,
$f(x) \leq x$ $(0<x<0.5)$; and means for outputting said interpolation output pixel as an output video signal separated in a pixel unit.

5. A video signal processor as claimed in claim 4, wherein said means for calculating an interpolation distance between a pixel position of an original image and a pixel position of an interpolation output pixel comprises:

means for holding interpolation ratio data;

means for performing cumulative addition of said interpolation ratio data with modulus N (N being an integer 2 or higher); and means for outputting the interpolation distance on the basis of a value obtained by said cumulative addition.

6. A video signal processor which performs an interpolation processing upon a video signal separated in a pixel unit and outputs a video signal in one dimensional form formed by a horizontal and vertical scanning means, said video signal processor comprising:

hold means for a plurality of pixels of an original image input from a buffer memory;

means for calculating an interpolation distance between a pixel position of an interpolation output pixel;

control means for controlling said hold means on the basis of said interpolation distance;

conversion means for nonlinearly converting said interpolation distance in accordance with a non-linear function of the following conditions:

when an amplitude of an input signal (x) is normalized from 0 to 1.0, a converted output signal $f(x)(0\leq f(x) \leq 1.0)$ satisfies the following conditions for a constant number A which satisfies $0<A<0.5$,
when $0 \leq x \leq A$, $f(x)=0$,
when $A \leq x \leq (1-A)$, $f(x)=(x-A)/(1-2A)$,
when $(1-A)<x\leq(1.0)$, $f(x)=1.0$; and means for outputting said interpolation output pixel as an output video signal separated in a pixel unit.

7. A video signal processor as claimed in claim 6, wherein said constant number A satisfies $0.2 \leq A \leq 0.3$.

8. A video signal processor which performs a two-dimensional interpolation processing upon a video signal separated in a pixel unit and outputs a video signal in one-dimensional form formed by a horizontal and vertical scanning means, said video signal processor comprising:

hold means for a plurality of pixels of an original image input from a buffer memory;

first calculation means for calculating a vertical interpolation distance in a vertical direction between a pixel of an original image and a vertical interpolation pixel position;

first control means for controlling the buffer memory of said hold means on a line basis on the basis of said vertical interpolation distance;

first conversion means for converting said vertical interpolation distance in accordance with a first non-linear function;

first producing means for producing a vertical interpolation pixel from pixels of adjacent two line on a basis ofsaid vertical interpolation distance converted in accordance with said first non-linear function;

second calculation means for calculating a horizontal interpolation distance in a horizontal direction between said vertical interpolation pixel and a horizontal interpolation pixel position;

second control means for controlling the buffer memory of said hold means on a pixel basis on the basis of said horizontal interpolation distance;

second conversion means for converting said horizontal interpolation distance in accordance with a second non-linear function;

second producing means for producing a horizontal interpolation pixel from adjacent two pixels obtained by a vertical interpolation processing on a basis of said horizontal interpolation distance converted in accordance with said second non-linear characteristic; and means for outputting an interpolation output pixel as an output video signal separated in a pixel unit, wherein at least one of said first and second conversion means satisfies the following conditions:

when an amplitude of an input signal (x) is normalized from 0 to 1.0, a converted output signal $f(x)(0\leq f(x) \leq 1.0)$ takes values as follows,
when $x=0 f(0)=0$,
when $x=0.5$, $f(0.5)=0.5$,
when $x=1.0$, $f(1.0)=1.0$, and $f(x)$ satisfies
$f(x)=1-f(1-x)$ $(0<x<0.5)$ and
$f(x) \leq x$ $(0<x<0.5)$.

9. A video signal processor as claimed in claim 8, wherein said first and second producing means each includes means for linearly adding horizontal or vertical pixel data on the basis of said interpolation distance converted in accordance with said non-linear function.

10. A video signal processor as claimed in claim 8, wherein said first conversion means and said second conversion means have mutually different conversion characteristics.

11. A video signal processor which performs a two-dimensional interpolation processing upon a video signal separated in a pixel unit and outputs a video signal in one-dimensional form formed by a horizontal and vertical scanning means, said video signal processor comprising:

hold means for a plurality of pixels of an original image input from a buffer memory;

first calculation means for calculating a vertical interpolation distance in a vertical direction between a pixel of an original image and a vertical interpolation pixel position;

first control means for controlling the buffer memory of said hold means on a line basis on the basis of said vertical interpolation distance;

first conversion means for converting said vertical interpolation distance in accordance with a first non-linear function;

first producing means for producing a vertical interpolation pixel from pixels of adjacent two line on a basis of said vertical interpolation distance converted in accordance with said first non-linear function;

second calculation means for calculating a horizontal interpolation distance in a horizontal direction between said vertical interpolation pixel and a horizontal interpolation pixel position;

second control means for controlling the buffer memory of said hold means on a pixel basis on the basis of said horizontal interpolation distance;

second conversion means for converting said horizontal interpolation distance in accordance with a second non-linear function;

second producing means for producing a horizontal interpolation pixel from adjacent two pixels obtained by a vertical interpolation processing on a basis of said horizontal interpolation distance converted in accordance with said second non-linear characteristic; and means for outputting an interpolation output pixel as an output video signal separated in a pixel unit, wherein at least one of said first and second conversion means satisfies the following conditions:

when an amplitude of an input signal x is normalized from 0 to 1.0, a converted output signal $f(x)$ $(0 \leq f(x) \leq 1.0)$ satisfies the following conditions for a constant number A which satisfies $0 < A < 0.5$, when $0 \leq x \leq A$ $f(x)=0$, when $A \leq x \leq (1-A)$, $f(x)=(x-A)/(1-2A)$, and when $(1-A) < x \leq (1.0)$, $f(x)=1.0$.

12. A video signal processor as claimed in claim 11, wherein said constant number A satisfies $0.2 \leq A \leq 0.3$.

13. A video signal processor which performs a two-dimensional interpolation processing upon a video signal separated in a pixel unit and outputs a video signal in one-dimensional form formed by a horizontal and vertical scanning means, said video signal processor comprising:

hold means for a plurality of pixels of an original image input from a buffer memory;

first calculation means for calculating a vertical interpolation distance in a vertical direction between a pixel of an original image and a vertical interpolation pixel position;

first control means for controlling the buffer memory of said hold means on a line basis on the basis of said vertical interpolation distance;

first conversion means for converting said vertical interpolation distance in accordance with a first non-linear function;

first producing means for producing a vertical interpolation pixel from pixels of adjacent two line on a basis ofsaid vertical interpolation distance converted in accordance with said first non-linear function;

second calculation means for calculating a horizontal interpolation distance in a horizontal direction between said vertical interpolation pixel and a horizontal interpolation pixel position;

second control means for controlling the buffer memory of said hold means on a pixel basis on the basis of said horizontal interpolation distance;

second conversion means for converting said horizontal interpolation distance in accordance with a second non-linear function;

second producing means for producing a horizontal interpolation pixel from adjacent two pixels obtained by a vertical interpolation processing on a basis of said horizontal interpolation distance converted in accordance with said second non-linear characteristic; and means for outputting an interpolation output pixel as an output video signal separated in a pixel unit, wherein said first calculation means for calculating a vertical interpolation distance in a vertical direction between a pixel of an original image and a vertical interpolation pixel position comprises:

means for holding vertical interpolation ratio data;

means for performing cumulative addition of said vertical interpolation ratio data with modulus M (M being an integer of 2 or higher); and means for outputting said vertical interpolation distance on the basis of a value obtained by said cumulative addition.

14. A video signal processor as claimed in claim 13, wherein said second calculation means for calculating a horizontal interpolation distance in a horizontal direction between said vertical interpolation pixel and a horizontal interpolation pixel position comprises:

means for holding horizontal interpolation ratio data;

means for performing cumulative addition of said horizontal interpolation ratio with modulus N (N being an integer of 2 or higher); and means for outputting said horizontal interpolation distance on the basis of a value obtained by said cumulative addition.

15. A video signal processor comprising:

a memory which stores a digitized video signal;

a conversion circuit which receives said digitized video signal and converts an output format of said digitized video signal in accordance with a display format by using an interpolation in which a first interpolation distance between an original signal position and an interpolation position is obtained and an interpolation signal is produced by applying a weighted mean on a basis of a second interpolation distance obtained by converting said first interpolation distance in accordance with a non-linear function; and a clock generator which generates a first clock to read said digitized video signal from said memory and a second clock to output said interpolation signal from said conversion circuit, wherein said conversion circuit comprises:

a buffer memory which stores said digitized video signal;

a delay circuit connected to said buffer memory;

an interpolation control circuit connected to said buffer memory and said delay circuit, which produces said first interpolation distance between said original signal position and said interpolation position;

a non-linear circuit connected to said interpolation control circuit, which converts said first interpolation distance in accordance with said non-linear function and produces said second interpolation distance; and a factor addition circuit connected to an input and an output of said delay circuit and to said non-linear circuit, which produces said interpolation signal by applying a weighted mean to an input signal to said delay circuit and an output signal from said delay circuit on the basis of said second interpolation distance.

16. A video signal processor as claimed in claim 15, wherein said non-linear circuit satisfies the following conditions:

when an amplitude of an input signal (x) to said delay circuit is normalized from 0 to 1.0, said second interpolation distance represented by a function $f(x) (0 \leq f(x) \leq 1.0)$ takes values as follows,
when $x=0$, $f(0)=0$
when $x=0.5$, $f(0.5)=0.5$
when $x=1.0$, $f(1.0)=1.0$ and $f(x)$ satisfies
$f(x)=1-f(1-x)$ $(0<x<0.5)$
$f(x) \leq x$ $(0<x<0.5)$.

17. A video signal processor as claimed in claim 15, wherein said non-linear circuit satisfies the following conditions:

when an amplitude of an input signal (x) to said delay circuit is normalized from 0 to 1.0, said second interpolation distances represented by a (function $f(x)$ $(0 \leq f(x) \leq 1.0)$ satisfies the following conditions for a constant number A which satisfies $0<A<0.5$,
when $0 \leq x \leq A$, $f(x)=0$
when $A \leq x \leq (1-A)$, $f(x)=(x-A)/(1-2A)$
$(1-A)<x \leq 1.0$, $f(x)=1.0$.

18. A video signal processor as claimed in claim 17, wherein said constant number A satisfies $0.2 \leq A \leq 0.3$.

19. A video signal processor as claimed in claim 15, further comprising a low-pass filter for filtering analog interpolation signal obtained by converting said interpolation signal.

20. A video signal processor as claimed in claim 15, wherein said interpolation control circuit comprises:

a register which sets data information for said interpolation;

an adder which adds a set value of said register;

a latch which latches an output of said adder in accordance with a horizontal synchronization signal to produce said first interpolation distance; and a calculator which calculates an interpolation coefficient on a basis of said first interpolation distance for subsequent conversion in accordance with said non-linear function.

21. A display apparatus including video signal processing circuits for respective color component of video signals comprising:

a memory circuit which stores a digitized video signal for each video signal processing circuit;

a conversion circuit, provided for each video signal processing circuit, which receives said digitized video signal and converts an output format of said digitized video signal in accordance with a display format by using an interpolation in which a first interpolation distance between an original signal position and an interpolation position is obtained and an interpolation signal is produced by applying a weighted mean on a basis of a second interpolation distance obtained by converting said first interpolation distance in accordance with a non-linear function; and a clock generator connected to said memory circuit and said conversion circuit of each video signal processing circuit, which generates a first clock to read said digitized video signal from said memory circuit of each video processing circuit and a second clock to output said interpolation signal from said conversion circuit of each video processing circuit, wherein said conversion circuit comprises:

a buffer memory which stores said digitized video signal;

a delay circuit connected to said buffer memory;

an interpolation control circuit connected to said buffer memory and said delay circuit, which produces said first interpolation distance between said original signal position and said interpolation position;

a non-linear circuit connected to said interpolation control circuit, which converts said first interpolation distance in accordance with said non-linear function and produces said second interpolation distance; and a factor addition circuit connected to an input and an output of said delay circuit and to said non-linear circuit, which produces said interpolation signal by applying a weighted mean to an input signal to said delay circuit and an output signal from said delay circuit on the basis of said second interpolation distance.

22. A display apparatus as claimed in claim 21, wherein said non-linear circuit satisfies the following conditions:

when an amplitude of an input signal (x) to said delay circuit is normalized from 0 to 1.0, said second interpolation distance represented by a function $f(x)$ $(0 \leq f(x) \leq 1.0)$ takes values as follows,
when $x=0$, $f(0)=0$
when $x=0.5$, $f(0.5)=0.5$
when $x=1.0$, $f(1.0)=1.0$ and $f(x)$ satisfies
$f(x)=1-f(1-x)$ $(0<x<0.5)$
$f(x) \leq x$ $(0<x<0.5)$.

23. A display apparatus as claimed in claim 22, wherein said interpolation control circuit comprises:

a register which sets data information for said interpolation;

an adder which adds a set value of said register;

a latch which latches an output of said adder in accordance with a horizontal synchronization signal to produce said first interpolation distance; and a calculator which calculates an interpolation coefficient on a basis of said first interpolation distance for subsequent conversion in accordance with said non-linear function.

24. A display apparatus as claimed in claim 21, wherein said non-linear circuit satisfies the following conditions:

when an amplitude of an input signal (x) to said delay circuit is normalized from 0 to 1.0, said second interpolation distances represented by a (function $f(x)$ $(0 \leq f(x) \leq 1.0)$ satisfies the following conditions for a constant number A which satisfies $0<A<0.5$,
when $0 \leq x \leq A$, $f(x)=0$
when $A \leq x \leq (1-A)$, $f(x)=(x-A)/(1-2A)$
$(1-A)<x \leq 1.0$, $f(x)=1.0$.

25. A display apparatus as claimed in claim 24, wherein said constant number A satisfies $0.2 \leq A \leq 0.3$.

26. A display apparatus as claimed in claim 21, further comprising a low-pass filter for filtering analog interpolation signal obtained by converting said interpolation signal.

27. A video signal processor for use in a display device, comprising:

a memory which stores a video signal;

a conversion circuit which converts said video signal from a first signal format to a second signal format for a visual display on said display device by using an interpolation in which a weight coefficient based on an interpolation distance between an original signal position and an interpolation position is obtained and an interpolation signal is produced by applying a weighted mean on a basis of a non-linear weight coefficient obtained by converting said weight coefficient in accordance with a non-linear function; and a clock generator which generates a first clock to read said video signal from said memory and a second clock to output said interpolation signal from said conversion circuit, wherein said conversion circuit comprises:

a buffer memory which stores said video signal;

a delay circuit connected to said buffer memory;

an interpolation control circuit connected to said buffer memory and said delay circuit, which produces said weight coefficient based on said interpolation distance between said original signal position and said interpolation position;

a non-linear circuit connected to said interpolation control circuit, which converts said weight coefficient in accordance with said non-linear function and produces said non-linear weight coefficient; and a factor addition circuit connected to an input and an output of said delay circuit and to said non-linear circuit, which produces said interpolation signal by applying a weighted mean to an input signal to said delay circuit and an output signal from said delay circuit on the basis of said non-linear weight coefficient.

28. A video signal processor as claimed in claim 27, wherein said interpolation control circuit comprises:

a register which sets data information for said interpolation;

an adder which adds a set value of said register;

a latch which latches an output of said adder in accordance with a horizontal synchronization signal to produce said interpolation distance; and a calculator which calculates said weight coefficient on a basis of said interpolation distance for subsequent conversion in accordance with said non-linear function.

29. A video signal processor as claimed in claim 28, wherein said non-linear circuit satisfies the following conditions:

when an amplitude of an input signal (x) to said delay circuit is normalized from 0 to 1.0, said non-linear coefficient represented by a (function $f(x)$ ($0 \leq f(x) \leq 1.0$) satisfies the following conditions for a constant number A which satisfies $0<A<0.5$, when $0 \leq x \leq A$, $f(x)=0$ when $A \leq x \leq (1-A)$, $f(x)=(x-A)/(1-2A)$ $(1-A)<x \leq 1.0$, $f(x=1.0$.

30. A video signal processor as claimed in claim 29, wherein said constant number A satisfies $0.2 \leq A \leq 0.3$.

* * * * *